United States Patent
Sato

(10) Patent No.: US 12,442,633 B2
(45) Date of Patent: Oct. 14, 2025

(54) POSITION MEASUREMENT DEVICE AND POSITION MEASUREMENT METHOD

(71) Applicant: NIKON CORPORATION, Tokyo (JP)

(72) Inventor: Shinji Sato, Fukaya (JP)

(73) Assignee: NIKON CORPORATION, Tokyo (JP)

(*) Notice: Subject to any disclaimer, the term of this patent is extended or adjusted under 35 U.S.C. 154(b) by 129 days.

(21) Appl. No.: 18/567,782

(22) PCT Filed: Jun. 11, 2021

(86) PCT No.: PCT/JP2021/022363
§ 371 (c)(1),
(2) Date: Dec. 7, 2023

(87) PCT Pub. No.: WO2022/259536
PCT Pub. Date: Dec. 15, 2022

(65) Prior Publication Data
US 2024/0393100 A1      Nov. 28, 2024

(51) Int. Cl.
*G01B 11/00* (2006.01)
*B25J 9/16* (2006.01)

(52) U.S. Cl.
CPC ........... *G01B 11/005* (2013.01); *B25J 9/1697* (2013.01)

(58) Field of Classification Search
CPC ............................ G01B 11/005; G01B 11/002
See application file for complete search history.

(56) References Cited

U.S. PATENT DOCUMENTS

| | | |
|---|---|---|
| 2010/0103431 A1 | 4/2010 | Demopoulos |
| 2019/0011536 A1 | 1/2019 | Ohtomo et al. |
| 2019/0145758 A1* | 5/2019 | Wilson ............... G01B 11/2513 356/610 |

(Continued)

FOREIGN PATENT DOCUMENTS

| | | |
|---|---|---|
| JP | 2001025985 A | 1/2001 |
| JP | 2003240549 A | 8/2003 |

(Continued)

OTHER PUBLICATIONS

Extended European Search Report issued Apr. 11, 2025 in corresponding European Patent Application No. 21945208.3, 7 pages.

(Continued)

*Primary Examiner* — Tony Ko
(74) *Attorney, Agent, or Firm* — XSENSUS LLP

(57) ABSTRACT

A position measurement device includes a position measurement unit configured to irradiate measurement light to a reflective element, receive reflected light reflected by the reflective element, and acquire position information of the reflective element in a three-dimensional space and a reference position measurement unit configured to irradiate reference measurement light to at least one reference reflective element, receive reference reflected light reflected by the reference reflective element, and acquire position information of the reference reflective element in a three-dimensional space. The position information of the reflective element acquired by the position measurement unit is corrected using the position information of the reference reflective element measured by the reference position measurement unit.

20 Claims, 17 Drawing Sheets

(56) References Cited

U.S. PATENT DOCUMENTS

2023/0152452 A1* 5/2023 Feng .................. G01S 17/36
356/4.01

FOREIGN PATENT DOCUMENTS

| JP | 2010-520075 A | 6/2010 |
| JP | 2019-015601 A | 1/2019 |
| WO | 2007/002319 A1 | 1/2007 |

OTHER PUBLICATIONS

International Search Report issued Sep. 7, 2021 in corresponding International Patent Application No. PCT/JP2021/022363, 9 pages.
Written Opinion of the International Searching Authority issued Sep. 7, 2021 in corresponding International Patent Application No. PCT/JP2021/022363, 12 pages.
Japanese Office Action issued Jan. 7, 2025 in corresponding Japanese Patent Application No. 2023-526815, 16 pages.

* cited by examiner (X, Y, Z, Tx, Ty, Tz)

POSITION MEASUREMENT DEVICE AND POSITION MEASUREMENT METHOD

CROSS-REFERENCE TO RELATED APPLICATION

The present application is a national stage application, filed under 35 U.S.C. § 371, of International Patent Application No. PCT/JP2021/022363, filed Jun. 11, 2021, the entire contents of which are incorporated herein by reference.

TECHNICAL FIELD

The present invention relates to a position measurement device and a position measurement method.

BACKGROUND ART

Robots and machine tools automatically perform processing and assembly steps. In these steps, it is necessary to measure a position of an arm of the robot to be controlled and a position of a tip of a spindle of a machine tool with high accuracy so that the accuracy of processing and assembly is improved. For example, a device for measuring a position of a predetermined part of a robot device using an external measurement device is known (Patent Document 1).

In the control of a robot, it is necessary to measure the position of the robot with high accuracy.

CITATION LIST

Patent Document

[Patent Document 1]
PCT International Publication No. WO 2007/002319

SUMMARY OF INVENTION

According to an aspect of the present invention, there is provided a position measurement device including: a position measurement unit configured to irradiate measurement light to a reflective element, receive reflected light reflected by the reflective element, and acquire position information of the reflective element in a three-dimensional space; and a reference position measurement unit configured to irradiate reference measurement light to at least one reference reflective element, receive reference reflected light reflected by the reference reflective element, and acquire position information of the reference reflective element in a three-dimensional space, wherein the position information of the reflective element measured by the position measurement unit is corrected using the position information of the reference reflective element acquired by the reference position measurement unit.

According to an aspect of the present invention, there is provided a position measurement device including: a first position measurement unit configured to irradiate first measurement light to a reflective element, receive first reflected light reflected by the reflective element, and acquire position information of the reflective element in a three-dimensional space; and a second position measurement unit configured to irradiate second measurement light to a reflective element, receive second reflected light reflected by the reflective element, and acquire position information of the reflective element in a three-dimensional space.

According to an aspect of the present invention, there is provided a position measurement device including: a position measurement unit configured to irradiate measurement light to an input surface of a reflective element, receive reflected light, and acquire position information of the reflective element in a three-dimensional space; an imaging unit configured to image the reflective element to which the measurement light is input; and an input information acquisition unit configured to acquire input information with respect to an input of the measurement light from an image of the reflective element imaged by the imaging unit, wherein the position information acquired by the position measurement unit is corrected on the basis of the input information.

According to an aspect of the present invention, there is provided a position measurement device including a position measurement unit configured to irradiate measurement light to an input surface of a reflective element, receive reflected light, and acquire position information of the reflective element in a three-dimensional space, wherein the position measurement unit includes a distance measurement unit configured to irradiate the measurement light to the reflective element, receive the reflected light, and measure a distance to the reflective element and an irradiation direction movement unit configured to move an irradiation direction of the measurement light, and wherein the irradiation direction movement unit sequentially moves and irradiates the measurement light toward a plurality of reflective elements provided on a measurement target object.

According to an aspect of the present invention, there is provided a position measurement method including: irradiating measurement light to a reflective element, receiving reflected light reflected by the reflective element, and acquiring position information of the reflective element in a three-dimensional space; irradiating reference measurement light to at least one reference reflective element, receiving reference reflected light reflected by the reference reflective element, and acquiring position information of the reference reflective element in a three-dimensional space; and correcting the position information of the reflective element using the position information of the reference reflective element.

According to an aspect of the present invention, there is provided a position measurement method including: irradiating measurement light to an input surface of a reflective element, receiving reflected light, and acquiring position information of the reflective element in a three-dimensional space; imaging the reflective element to which the measurement light is input; acquiring input information with respect to an input of the measurement light from an image of the imaged reflective element; and correcting the acquired position information on the basis of the input information.

According to an aspect of the present invention, there is provided a position measurement method including irradiating measurement light to input surfaces of a plurality of reflective elements provided on a measurement target object, receiving reflected light, and acquiring position information of the reflective element in a three-dimensional space, the position measurement method including: moving an irradiation direction of the measurement light toward the plurality of reflective elements provided on the measurement target object; irradiating the measurement light to the reflective element, receiving the reflected light, and measuring a distance to the reflective element; and sequentially performing the movement and the measurement with respect to each of the plurality of reflective elements provided on the measurement target object.

DESCRIPTION OF EMBODIMENTS

First Embodiment

Figure 1:
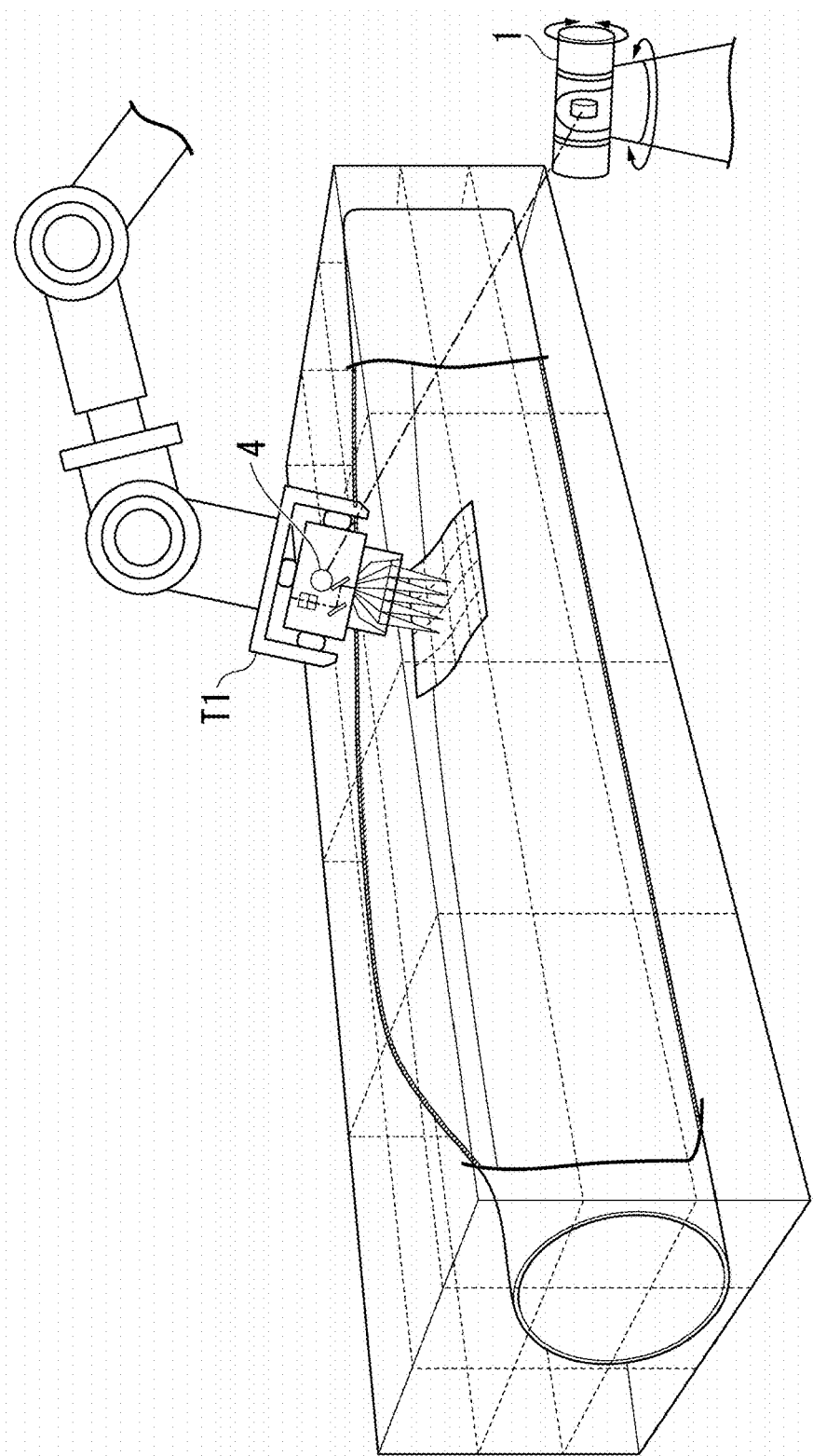
FIG. 1 is a diagram showing an example of a state in which a position measurement device according to a first embodiment measures a position of a measurement target.

Hereinafter, a first embodiment will be described in detail with reference to the drawings. FIG. 1 is a diagram showing an example of a state in which a position measurement device 1 according to the present embodiment measures a position of a measurement target. In FIG. 1, the measurement target is a robot T1 as an example. The robot T1 includes a movable unit. The movable unit includes a tip part for processing a material. In the example shown in FIG. 1, a light processing head is provided on the tip part.

The position measurement device 1 irradiates measurement light to a reflective element 4 arranged in the movable unit of the measurement target and receives reflected light. The position measurement device 1 measures position information on the basis of a light reception result. The position information is information indicating the position of the reflective element 4 with respect to a reference position. The reference position is a predetermined position in a space where the reflective element 4 is arranged.

The position information is indicated by the coordinates of a coordinate system (referred to as a reference coordinate system) in the space where the reflective element 4 is arranged. The position information is indicated by, for example, Cartesian coordinates (X, Y, Z). A set of coordinates X, Y, and Z indicates a position in Cartesian coordinates (X, Y, Z). In addition, the coordinates X, Y, and Z may be referred to as a distance in an X-direction, a distance in a Y-direction, and a distance in a Z-direction, respectively.

The position measurement device 1 transmits measured position information to a control system of a machine tool or robot. The reference position and the coordinate system are shared in advance between the position measurement device 1 and the control system. Because the control system can acquire the position of the machine tool or robot on the basis of the position information received from the position measurement device 1, the machine tool or robot can be calibrated with high accuracy.

The position measurement device 1 irradiates measurement light to the reflective element 4 arranged in the movable unit of the measurement target and receives reflected light. First, the position measurement device 1 calculates distance information on the basis of a light reception result. The distance information is information indicating a distance from the position measurement device 1 to the reflective element 4.

The position measurement device 1 acquires direction information on the basis of an irradiation direction of the measurement light. The direction information is information indicating a direction of the reflective element 4 for a reference direction. The reference direction is, for example, a direction in which an azimuth angle and an elevation angle are set to zero in the position measurement device 1. Alternatively, it may be a direction in which a predetermined reference point is seen from the position measurement device 1. The direction information is indicated by a set of azimuth and elevation angles (i.e., an angular component of spherical coordinates).

The position measurement device 1 calculates a relative position of the reflective element 4 for the position measurement device 1 on the basis of the acquired distance and direction information. The position measurement device 1 calculates the position of the reflective element 4 for the reference position (i.e., the position of the reflective element 4 in the reference coordinate system) as position information on the basis of a relative position for the position measurement device 1 of the reference position and the relative position of the reflective element 4 for the position measurement device 1.

In addition, the position information may be indicated by spherical coordinates or may be indicated by another Cartesian coordinate system. The Cartesian coordinate system is a general term for a coordinate system in which unit vectors are orthogonal.

The position is a physical quantity indicating where a physical object is located in the space. The distance is a physical quantity indicating a length measured between two points in the space. The distance is, for example, a Euclidean distance.

Figure 2:
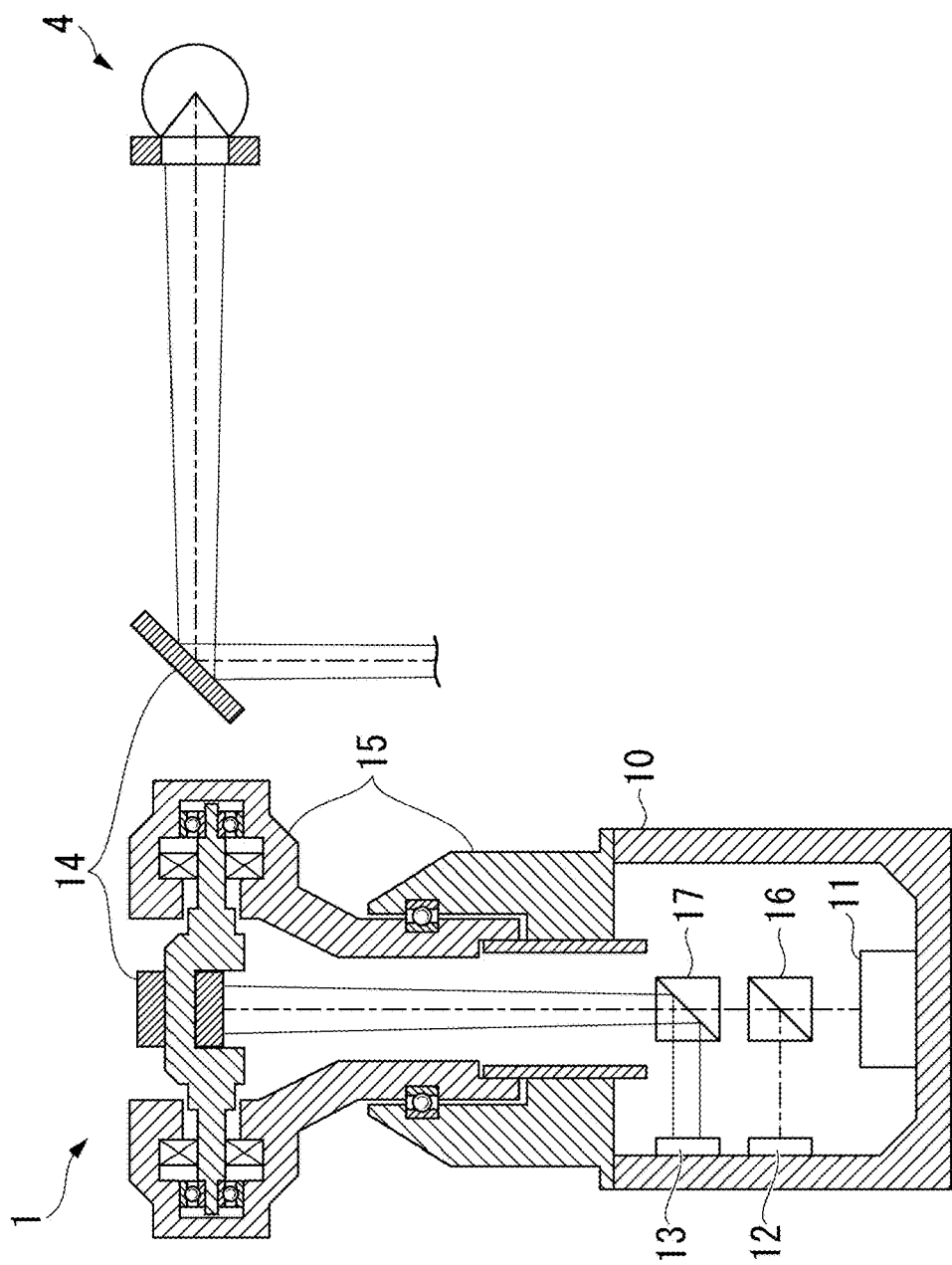
FIG. 2 is a diagram showing an example of a configuration of the position measurement device according to the first embodiment.
Figure 2:
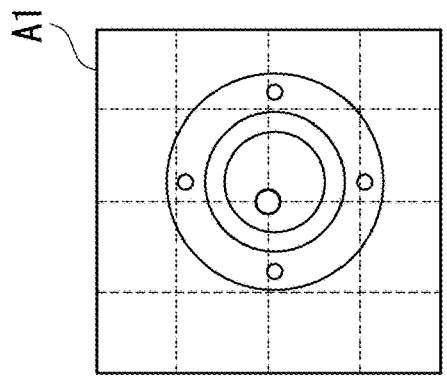

Next, a configuration of the position measurement device 1 will be described. FIG. 2 is a diagram showing an example of the configuration of the position measurement device 1 according to the present embodiment. The position measurement device 1 includes a housing 10, an optical frequency comb interferometer 11, a four-division position sensitive detector (PSD) 12, a coaxial camera 13, a beam steering mirror 14, a pointing mirror assembly (PMA) 15, a first half mirror 16, a second half mirror 17, and a reference measurement light irradiation unit 19 (not shown in FIG. 2).

The housing 10 is a member for installing a main body of the position measurement device 1 on the installation target. In the present embodiment, the installation target is a factory floor or the like.

The housing 10, for example, fixes the position measurement device 1 on the installation target according to its own load. In addition, the housing 10 may include a mechanism for fixing the position measurement device 2 on the installation target.

Also, each component of the position measurement device 1 is provided in the housing 10. The beam steering mirror 14 and the PMA 15 are provided on the outer side of the housing 10. Inside of the housing 10, the optical frequency comb interferometer 11, the four-division PSD 12, the coaxial camera 13, the first half mirror 16, and the second half mirror 17 are provided. Also, the housing 10 has a space for propagating measurement light and reflected light inside thereof.

The optical frequency comb interferometer 11 measures a distance from the optical frequency comb interferometer 11 to the measurement target. The optical frequency comb interferometer 11 irradiates an optical frequency comb as measurement light to the reflective element 4 arranged at the measurement target. The optical frequency comb is pulsed light whose spectral strengths are precisely and evenly spaced in a comb-like shape on the frequency axis. The optical frequency comb interferometer 11 receives reflected light generated by reflecting the optical frequency comb in the reflective element 4.

In the distance measurement using the optical frequency comb interferometer 11, a distance from the optical frequency comb interferometer 11 to the reflective element 4 is measured on the basis of a position at which interference fringes are generated between the different pulses of the optical frequency comb. The optical frequency comb interferometer 11, for example, can measure the distance with accuracy on the order of sub-micrometers.

The optical frequency comb interferometer 11 includes an irradiation unit, a light reception unit, and a signal processing unit. The irradiation unit includes a pulsed light source, a frequency control unit, and the like. The irradiation unit irradiates pulsed light generated by the pulsed light source as measurement light to the measurement target. Also, the irradiation unit branches a part of the pulsed light generated by the pulsed light source and irradiates light to a reference surface in the optical frequency comb interferometer 11 as reference light. The light reception unit includes a photodetector. The photodetector detects the reflected light and the reference light irradiated to the reference surface. When a detection result of the photodetector is input, the signal processing unit calculates a distance from the optical frequency comb interferometer 11 to the reflective element 4 on the basis of a position at which an interference fringe between the reflected light and the reference light is generated.

Here, the measurement light output by the optical frequency comb interferometer 11 is reflected by the beam steering mirror 14 and irradiated to the reflective element 4 after being transmitted through the first half mirror 16 and the second half mirror 17. Here, an optical path of the measurement light irradiated to the reflective element 4 is partially identical to that of the reflected light reflected by the reflective element 4.

The coaxial camera 13 captures an image of the reflective element 4, which is a measurement target. The coaxial camera 13 captures an image of the reflective element 4 according to reflected light obtained by reflecting natural light in the reflective element 4.

The coaxial camera 13 is used to capture the position of the reflective element 4. When the coaxial camera 13 captures an image of the reflective element 4, the position measurement device 1 roughly captures the position of the reflective element 4 and adjusts the irradiation direction of the measurement light.

An image A1 is an example of an image of the reflective element 4 captured by the coaxial camera 13. An imaging center of the coaxial camera 13 is adjusted to match the optical axis of the measurement light of the optical frequency comb interferometer 11. Therefore, a small circle in the center of the image A1 is the position of the measurement light and allows an input position for the reflective element 4 to be detected.

The four-division PSD 12 detects an input position of the reflected light for the light reception unit by detecting the reflected light from the reflective element 4. The reflected light is reflected light obtained by reflecting the measurement light irradiated by the optical frequency comb interferometer 11 in the reflective element 4. The reflected light is partially reflected by the first half mirror 16 and input to the four-division PSD 12.

The four-division PSD 12 includes, for example, photodiodes and a resistor. The photodiodes are arranged in an array shape. That is, the four-division PSD 12 includes a photodiode array. A detection surface of the four-division PSD 12 is divided into four detection surfaces. The four-division PSD 12 measures a position of spot light on the basis of an amount of spot light of the reflected light detected at each of the four division detection surfaces.

Therefore, the four-division PSD 12 is a photoelectric detection device that detects an amount of reflected light. The four-division PSD 12 is an example of a reflected light detection unit.

The four-division PSD 12 is used to finely adjust the irradiation direction of the measurement light after roughly capturing the position of the reflective element 4 in the coaxial camera 13 and appropriately return (input) the reflected light to the optical frequency comb interferometer 11.

Also, the position measurement device 1 may include another position detector instead of the four-division PSD 12. Other position detectors include, for example, a line sensor, a distance measurement instrument of a phase detection scheme, and the like.

Although the coaxial camera 13 is provided as an imaging unit different from the reflected light detection unit in the present embodiment, the present invention is not limited thereto. The four-division PSD 12 may be omitted from the configuration of the position measurement device 1 and the coaxial camera 13 may be used as the reflected light detection unit.

The beam steering mirror 14 reflects the measurement light output from the optical frequency comb interferometer 11 in the direction of the reflective element 4. Also, the beam steering mirror 14 reflects the reflected light obtained by reflecting the measurement light from the reflective element 4 in the direction of the optical frequency comb interferometer 11.

The PMA 15 moves (changes) a direction of the beam steering mirror 14. As an example, the PMA 15 includes a gimbal unit and a rotary encoder (not shown). The direction of the beam steering mirror 14 is changed by driving the gimbal unit. The gimbal unit can rotate the beam steering mirror 14 in each of a longitudinal direction (azimuth direction) and a latitudinal direction (elevation direction). The rotary encoder measures a rotation angle of the gimbal unit.

Here, the optical path of the reflected light used for imaging by the coaxial camera 13 described above is partially identical to the optical path of the measurement light or reflected light used for distance measurement by the optical frequency comb interferometer 11 described above. That is, at least a partial optical path of an optical system for imaging by the first imaging unit 23 is identical to at least a part of the optical path of an optical system for light reception by the light reception unit provided in the optical frequency comb interferometer 11.

The irradiation direction of the measurement light and the imaging direction of the coaxial camera 13 are coaxial. The imaging direction of the coaxial camera 13 is changed by changing the direction of the beam steering mirror 14 that changes the direction of the measurement light irradiated by the optical frequency comb interferometer 11. That is, the beam steering mirror 14 is commonly used for changing the irradiation direction of the measurement light irradiated by the optical frequency comb interferometer 11 and changing the imaging direction of the coaxial camera 13.

In addition, the position measurement device 1 may include a camera outside of the housing 10 instead of or in addition to the coaxial camera 13. In the camera, the optical path of the reflected light used for imaging is not identical to the optical path of the measurement light or the reflected light used for the distance measurement by the optical frequency comb interferometer 11 described above. Also, in this case, a drive mechanism for changing the imaging direction of the camera is provided. The camera, for example, may be used as a wide-angle camera capable of imaging surroundings of the position measurement device 1.

The first half mirror 16 transmits the measurement light output from the optical frequency comb interferometer 11. Also, the first half mirror 16 transmits a part of reflected light obtained by reflecting the measurement light in the reflective element 4 toward the optical frequency comb interferometer 11 and reflects the remaining part toward the four-division PSD 12.

The second half mirror 17 transmits the measurement light output from the optical frequency comb interferometer 11. Also, the second half mirror 17 transmits a part of reflected light obtained by reflecting the measurement light in the reflective element 4 toward the optical frequency comb interferometer 11. Also, the second half mirror 17 reflects reflected light obtained by reflecting natural light reflected from the reflective element 4 toward the coaxial camera 13.

The reflective element 4 is arranged in the measurement target. The reflective element 4 is arranged in the movable unit of the measurement target, such as a machine tool or robot. The reflective element 4 is, as an example, a retroreflector. The retroreflector is an optical element that reflects a beam in an input direction, regardless of an input position or direction of the beam in the retroreflector. That is, the retroreflector has a retroreflective function.

The reference measurement light irradiation unit 19 is provided as a part of the optical frequency comb interferometer 11. The reference measurement light irradiation unit 19 includes a first reference irradiation unit, a second reference irradiation unit, and a third reference irradiation unit.

In the present embodiment, the position measurement device 1 includes an optical system for branching the measurement light output from the optical frequency comb interferometer 11 inside of the housing 10. In the position measurement device 1, the measurement light can be divided into a maximum of eight branches by the optical system. In the present embodiment, the first reference measurement light, the second reference measurement light, and the third reference measurement light irradiated by the reference measurement light irradiation unit 19 are light branched from the measurement light output from the optical frequency comb interferometer 11.

That is, the measurement light of the distance measurement unit 200 and the reference measurement light of the reference distance measurement unit 210 are branched from the same light source and supplied.

Figure 3:
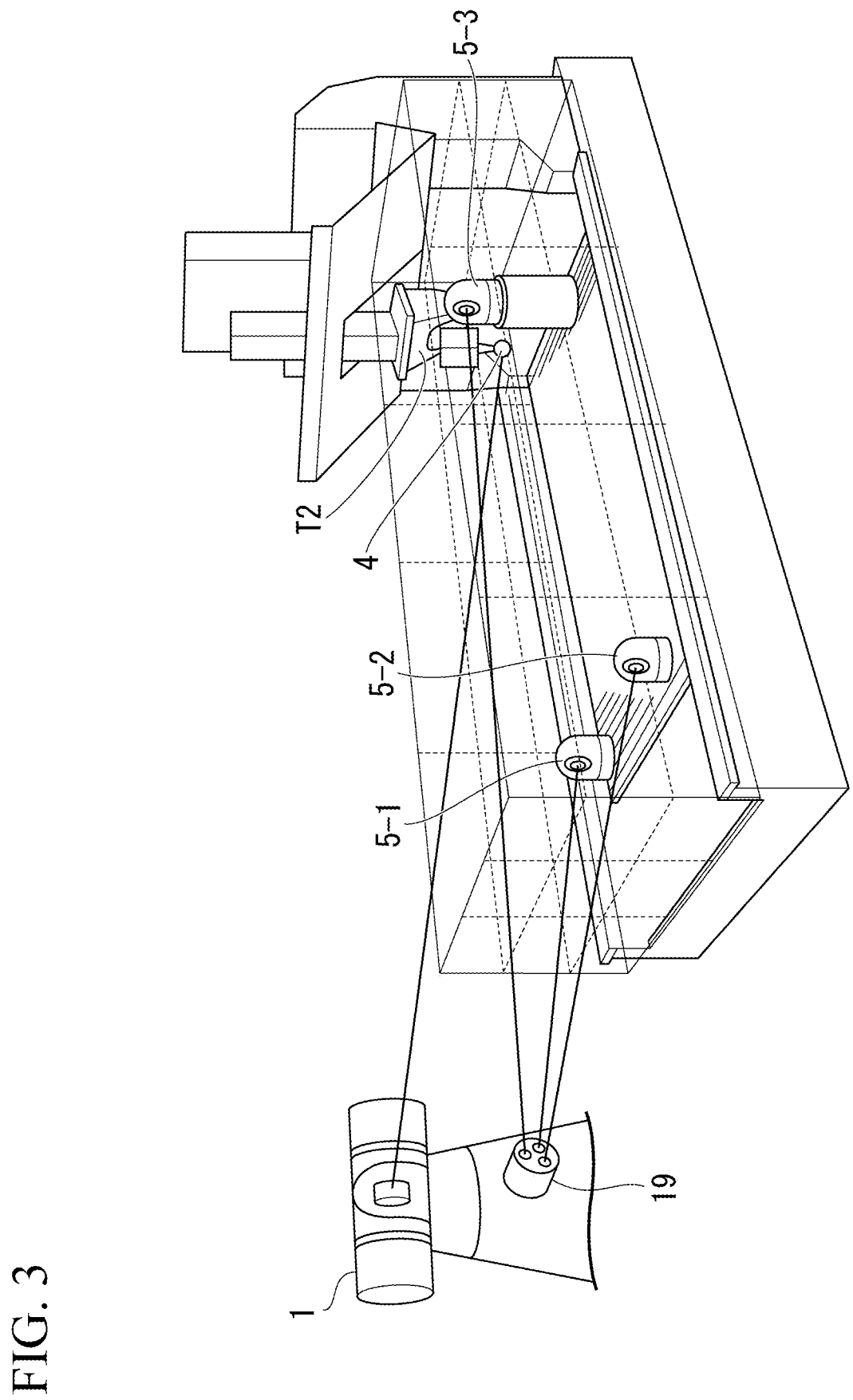
FIG. 3 is a diagram showing an example of a state in which the position measurement device according to the first embodiment measures a reference position.

FIG. 3 is a diagram showing an example of a state in which the position measurement device 1 according to the present embodiment performs measurement. In the present embodiment, the measurement target is, as an example, a movable unit of a machine tool. In the present embodiment, the reflective element 4 is arranged in a movable unit T2 of the machine tool. That is, the reflective element 4 is provided on a measurement target object capable of movement. In the present embodiment, the machine tool has a processing head and the processing head has an end effector such as an end mill. As an example, the movable unit T2 of the machine tool is a mechanism for changing an angle or position of the end mill to a desired angle or position.

As an example, the reference reflective element 5 includes three reflective elements, i.e., a first reference reflective element 5-1, a second reference reflective element 5-2, and a third reference reflective element 5-3. In the present embodiment, the first reference reflective element 5-1, the second reference reflective element 5-2, and the third reference reflective element 5-3 are arranged on a surface plate on which a processing target object to be processed by the machine tool is placed. That is, the reference reflective element 5 is provided on a measurement reference object different from the measurement target object on which the reflective element 4 is provided.

A three-dimensional coordinate system (reference coordinate system) and a reference (for example, the origin of the reference coordinate system) are set using the positions of the plurality of reference reflective elements 5 as a reference. The position of the origin of the three-dimensional coordinate system is, for example, the position of any one of the plurality of reference reflective elements 5. Details of a process of setting the reference coordinate system and the reference (origin) will be described below.

In the following description, the first reference reflective element 5-1, the second reference reflective element 5-2, and the third reference reflective element 5-3 may be collectively referred to as a plurality of reference reflective elements 5.

Each of the plurality of reference reflective elements 5 is a retroreflector. That is, each of the plurality of reference reflective elements 5 has a retroreflection function like the reflective element 4.

Figure 4:
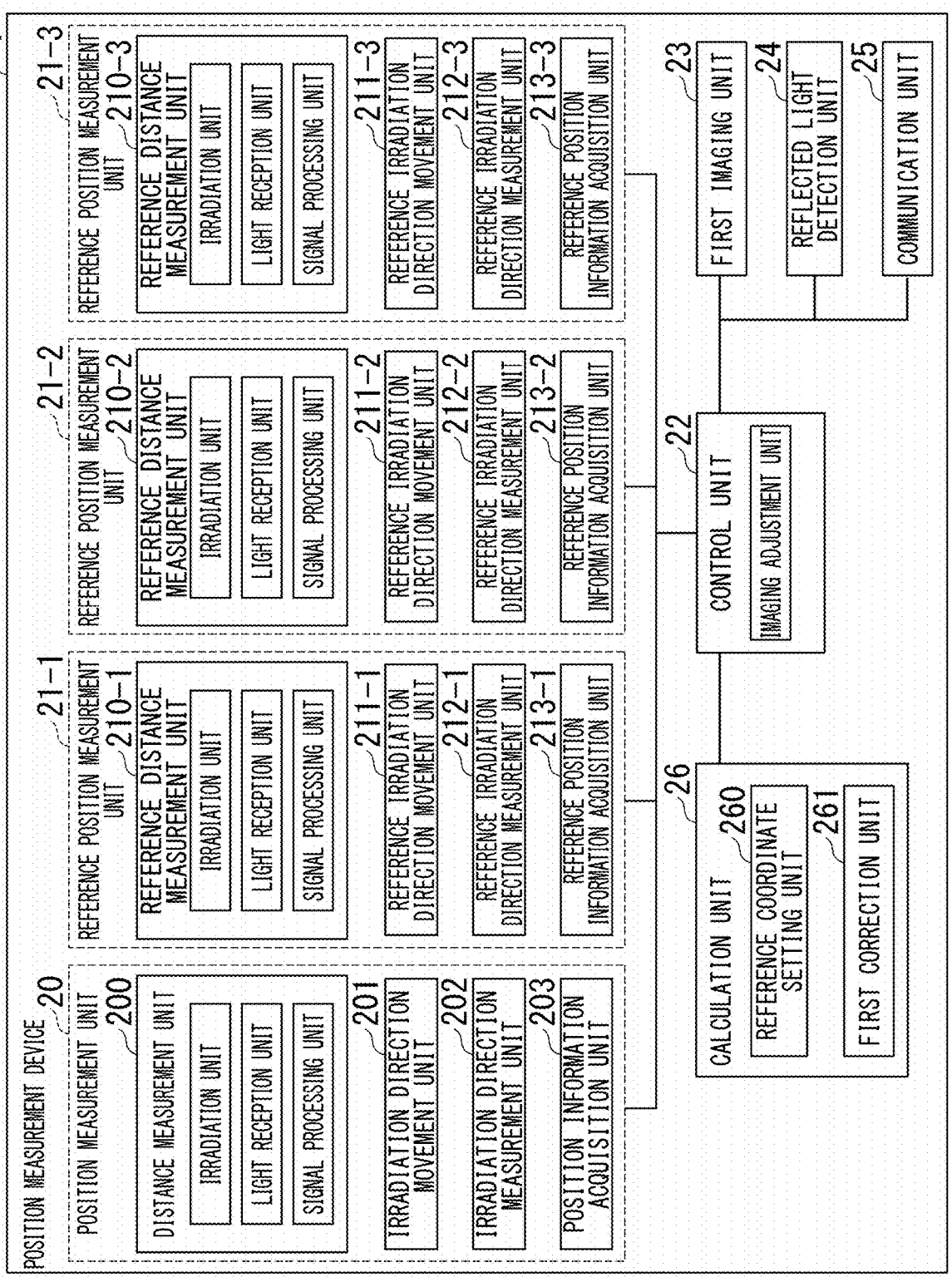
FIG. 4 is a diagram showing an example of a functional configuration of the position measurement device according to the first embodiment.

FIG. 4 is a diagram showing an example of a functional configuration of the position measurement device 1 according to the present embodiment. The position measurement device 1 includes a position measurement unit 20, a reference position measurement unit 21, a control unit 22, a first imaging unit 23, a reflected light detection unit 24, a communication unit 25, and a calculation unit 26.

The position measurement unit 20 includes a distance measurement unit 200, an irradiation direction movement unit 201, an irradiation direction measurement unit 202, and a position information acquisition unit 203.

The distance measurement unit 200 irradiates measurement light to the reflective element 4, receives reflected light, and measures a distance to the reflective element. The distance measurement unit 200 includes an irradiation unit, a light reception unit, and a signal processing unit. The irradiation unit irradiates the measurement light to the reflective element arranged in the movable unit of the measurement target. The light reception unit receives the reflected light. The signal processing unit processes a signal from the light reception unit and acquires information of the distance to the reflective element 4. The distance measurement unit 200 includes the optical frequency comb interferometer 11. The irradiation unit includes a pulsed light source provided in the optical frequency comb interferometer 11. The light reception unit includes a light reception unit provided in the optical frequency comb interferometer 11. The signal processing unit includes a signal processing unit provided in the optical frequency comb interferometer 11.

The irradiation direction movement unit 201 changes the irradiation direction of the measurement light. Changing the irradiation direction is also referred to as moving the irradiation direction. The irradiation direction movement unit 201 moves in the irradiation direction in accordance with the movement of the reflected light detected by the reflected light detection unit 24. The irradiation direction movement unit 201 includes a gimbal unit included in the PMA 15.

Here, in the present embodiment, as described above, the beam steering mirror 14 is commonly used for changing the irradiation direction of the measurement light irradiated by the optical frequency comb interferometer 11 and changing the imaging direction of the coaxial camera 13. Accordingly, the irradiation direction movement unit 201 includes an imaging adjustment unit. The imaging adjustment unit adjusts the imaging direction of the first imaging unit 23. Therefore, the irradiation direction movement unit 201 simultaneously moves the irradiation direction of the measurement light and the imaging direction of the first imaging unit 23.

The irradiation direction measurement unit 202 measures the irradiation direction of the measurement light. The irradiation direction measurement unit 202 includes a rotary encoder included in the PMA 15. The irradiation direction measurement unit 202 outputs a result of measuring the irradiation direction to the position information acquisition unit 203 of the distance measurement unit 200 as direction information.

The position information acquisition unit 203 acquires the position (position information) in the three-dimensional space of the reflective element 4 from the distance to the reflective element 4 (distance information) measured by the distance measurement unit 200 and the irradiation direction (direction information) of the measurement light measured by the irradiation direction measurement unit 202. Details of the acquisition of the position information will be described below.

As an example, the reference position measurement unit 21 includes three parts: a reference position measurement unit 21-1, a reference position measurement unit 21-2, and a reference position measurement unit 21-3. In the following description, the reference position measurement unit 21-1, the reference position measurement unit 21-2, and the reference position measurement unit 21-3 may be collectively referred to as the reference position measurement unit 21. Because the reference position measurement unit 21-1, the reference position measurement unit 21-2, and the reference position measurement unit 21-3 have the same function as each other, the reference position measurement unit 21 is represented by the reference position measurement unit 21-1 here. A functional configuration of the reference position measurement unit 21 will be described and the description of the reference position measurement unit 21-2 and the reference position measurement unit 21-3 will be omitted.

The reference position measurement unit 21-1 includes a reference distance measurement unit 210-1, a reference irradiation direction movement unit 211-1, a reference irradiation direction measurement unit 212-1, and a reference position information acquisition unit 213-1.

The reference distance measurement unit 210-1 irradiates reference measurement light to the first reference reflective element 5-1, receives the reference reflected light, and measures a distance to the first reference reflective element 5-1. The reference distance measurement unit 210-1 includes a first reference irradiation unit, a first reference light reception unit, and a first reference signal processing unit.

The first reference irradiation unit irradiates first reference measurement light to the first reference reflective element 5-1. The first reference irradiation unit includes an optical system for dividing the measurement light output from the optical frequency comb interferometer 11 into branches.

The first reference light reception unit receives first reference reflected light from the first reference reflective element 5-1. A light reception unit provided inside of the housing 10 of the position measurement device 1 is included.

The first reference signal processing unit processes a signal from the first reference light reception unit and acquires first reference distance information. The first reference distance information is information indicating a distance from the position measurement device 1 to the first reference reflective element 5-1.

The reference irradiation direction movement unit 211-1 changes an irradiation direction of the reference measurement light. Changing the irradiation direction is also referred to as moving the irradiation direction. The reference irradiation direction movement unit 211-1 includes a gimbal unit included in a PMA 15.

The reference irradiation direction measurement unit 212-1 measures the irradiation direction of the reference measurement light.

The reference position information acquisition unit 213-1 acquires a position (first reference position information) of the first reference reflective element 5-1 in the three-dimensional space from a distance (distance information) to the first reference reflective element 5-1 measured by the reference distance measurement unit 210 and the irradiation direction (direction information) of the reference measurement light measured by the reference irradiation direction measurement unit 212-1. Details of the acquisition of reference position information will be described below.

The reference position measurement unit 21-2 irradiates reference measurement light to the second reference reflective element 5-2, receives reference reflected light, and measures a position of the second reference reflective element 5-2. The reference position measurement unit 21-3 irradiates reference measurement light to the third reference reflective element 5-3, receives reference reflected light, and measures a position of the third reference reflective element 5-3. Because the functional configurations of the reference position measurement unit 21-2 and the reference position measurement unit 21-3 are similar to that of the reference position measurement unit 21-1, detailed description thereof will be omitted.

In addition, any one of the reference distance measurement unit 210-1, the reference distance measurement unit 210-2, and the reference distance measurement unit 210-3 may simply be referred to as a reference distance measurement unit 210. Also, the reference distance measurement unit 210-1, the reference distance measurement unit 210-2, and the reference distance measurement unit 210-3 may be collectively referred to as a plurality of reference distance measurement units 210.

Also, any one of the reference irradiation direction movement unit 211-1, the reference irradiation direction movement unit 211-2, and the reference irradiation direction movement unit 211-3 may simply be referred to as a reference irradiation direction movement unit 211. Also, the reference irradiation direction movement unit 211-1, the reference irradiation direction movement unit 211-2, and the reference irradiation direction movement unit 211-3 may be collectively referred to as a plurality of reference irradiation direction movement units 211.

Also, any one of the reference irradiation direction measurement unit 212-1, the reference irradiation direction measurement unit 212-2, and the reference irradiation direction measurement unit 212-3 may simply be referred to as a reference irradiation direction measurement unit 212. Also, the reference irradiation direction measurement unit 212-1, the reference irradiation direction measurement unit 212-2, and the reference irradiation direction measurement unit 212-3 may be collectively referred to as a plurality of reference irradiation direction measurement units 212.

Also, any one of the reference position information acquisition unit 213-1, the reference position information acquisition unit 213-2, and the reference position information acquisition unit 213-3 may simply be referred to as a reference position information acquisition unit 213. Also, the reference position information acquisition unit 213-1, the reference position information acquisition unit 213-2, and the reference position information acquisition unit 213-3 may be collectively referred to as a plurality of reference position information acquisition units 213.

The control unit 22 controls devices and components provided in the position measurement device 2. The control unit 22 includes, for example, a central processing unit (CPU), a graphics processing unit (GPU), a field-programmable gate array (FPGA), and the like, and performs various types of calculation and information exchange. The control unit 22 reads a program from the ROM and executes various types of control in accordance with the read program.

In addition, the control unit 22 and the devices and components provided in the position measurement device 1 are connected, for example, by signal lines. In addition, the control unit 22 may communicate with the devices and components provided in the position measurement device 2 through short-range wireless communication.

The control unit 22 causes the calculation unit 26 to execute various types of calculation. Also, the control unit 22 includes an imaging adjustment unit.

The calculation unit 26 includes a reference coordinate setting unit 260 and a first correction unit 261.

The reference coordinate setting unit 260 sets a reference (origin) and a reference coordinate system on the basis of the first reference position information, the second reference position information, and the third reference position information.

The first correction unit 261 acquires position information of the reflective element 4 for a reference generated by the reference coordinate setting unit 260. The position information of the reflective element 4 for the reference includes the position information of the reflective element 4 in the set reference coordinate system. The first correction unit 261 further corrects a change in the position information for the reference of the reflective element 4.

The first imaging unit 23 captures an image of the reflective element 4. The first imaging unit 23 includes the coaxial camera 13.

The reflected light detection unit 24 detects the reflected light from the reflective element 4. The reflected light detection unit 24 detects the movement of the reflected light moving with the movement of the reflective element 4. The reflected light detection unit 24 includes a four-division PSD 12.

The communication unit 25 communicates with an external device. The external device is, for example, a control system that controls a robot on which the reflective element 4 is installed. The communication unit 25 includes a transmission unit and a reception unit. The transmission unit transmits the position information of the reflective element 4 acquired by the position information acquisition unit included in the distance measurement unit 200 to the control system. The communication unit 25 includes a communication interface (I/F) for performing communication via a wireless network.

In a communication process of the communication unit 25, for example, a fifth-generation mobile communication system or a mobile communication system using light having a wavelength shorter than that of millimeter waves may be used. In the fifth-generation mobile communication system, a frequency band of 450 MHz to 6000 MHz and a frequency band of 24250 MHz to 52600 MHz are used as frequency bands.

Figure 5:
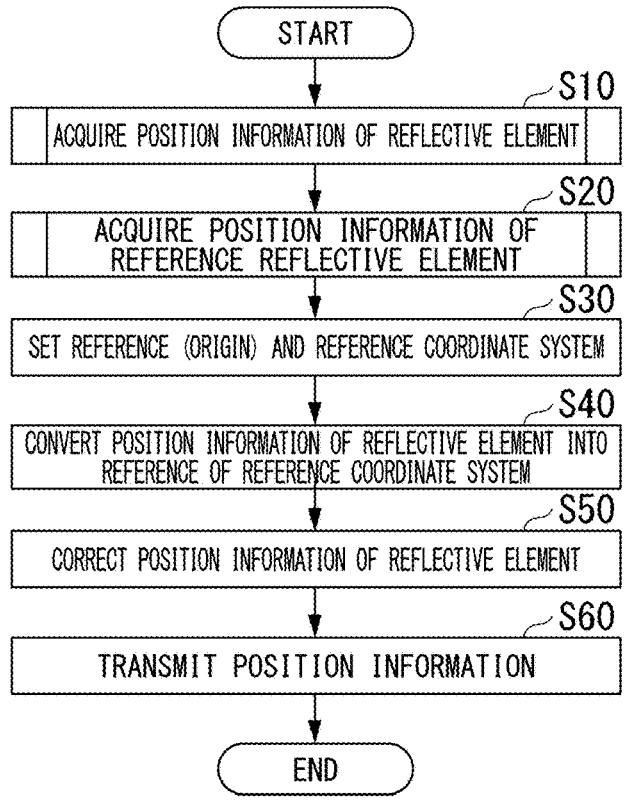
FIG. 5 is a diagram showing an example of a position measurement process according to the first embodiment.

Next, a position measurement process of the position measurement device 1 will be described with reference to FIG. 5. FIG. 5 is a diagram showing an example of the position measurement process according to the present embodiment. The position measurement process is executed by the control unit 22.

The position measurement unit 20 acquires position information of the reflective element 4 (step S10). The process of acquiring the position information of the reflective element 4 is referred to as a position measurement process. The position measurement unit 20 irradiates measurement light to the reflective element 4, receives the reflected light reflected by the reflective element 4, and acquires position information of the reflective element 4 in a three-dimensional space.

Figure 6:
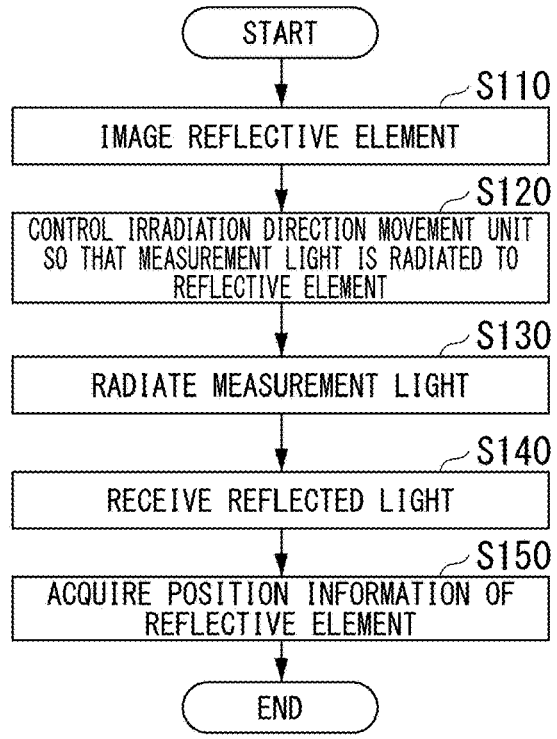
FIG. 6 is a diagram showing an example of a position information acquisition process according to the first embodiment.

Next, a position information acquisition process in step S10 will be described with reference to FIG. 6. FIG. 6 is a diagram showing an example of the position information acquisition process according to the present embodiment.

The control unit 22 captures an image of the reflective element 4 using the first imaging unit 23 (step S110). In addition, the control unit 22 may use the first imaging unit 23 to image one or both of at least a part of the robot, which is the measurement target, and the reflective element 4.

Here, the imaging adjustment unit provided in the control unit 22 adjusts an imaging direction of the first imaging unit 23 so that the reflective element 4 is included in an imaging range of the first imaging unit 23. The imaging direction is, for example, a direction in which an optical axis of an imaging lens is directed. In adjusting the imaging direction of the first imaging unit 23, the imaging adjustment unit may cause a direction in which the optical axis of the imaging lens is directed to overlap the reflective element 4 or it is only necessary to include the reflective element 4 in the imaging range even if the direction does not overlap the reflective element 4. On the basis of the image that is the imaging result of the first imaging unit 23, the imaging adjustment unit determines whether or not the reflective element 4 is included in the imaging range of the first imaging unit 23. The imaging adjustment unit has an image analysis function and discriminates the image of the reflective element 4 by analyzing the image of the imaging result of the first imaging unit 23. The imaging adjustment unit discriminates the image of the reflective element 4 on the basis of, for example, pattern matching. In addition, the irradiation direction movement unit 201 may learn the image of the reflective element 4 with AI (machine learning) in advance and discriminate the image of the reflective element 4 on the basis of a learning result.

In addition, in the imaging direction of the first imaging unit 23, a position where the position measurement device 1 is installed so that the reflective element 4 is included in the imaging range of the first imaging unit 23, and/or the direction of the housing 10 may be adjusted in advance. In this case, the imaging adjustment unit may be omitted from the configuration of the control unit 22.

The control unit 22 controls the irradiation direction movement unit 201 so that the measurement light is irradiated to the reflective element 4 on the basis of the imaging result of the first imaging unit 23 (step S120). The irradiation direction movement unit 201 changes the direction of the beam steering mirror 14 while using the measurement result of the irradiation direction by the rotary encoder. The irradiation direction movement unit 201 changes the direction of the beam steering mirror 14 in the longitudinal direction and/or the latitudinal direction via the gimbal unit. That is, the irradiation direction movement unit 201 moves in the irradiation direction in accordance with an instruction of the control unit 22 so that the measurement light is irradiated to the reflective element 4 serving as the measurement target discriminated on the basis of the imaging result of the first imaging unit 23.

Further, the control unit 22 controls the irradiation direction movement unit 201 so that the measurement light tracks the movement of the reflective element 4 serving as the measurement target on the basis of the imaging result of the first imaging unit 23. Because the irradiation direction movement unit 201 is driven so that the measurement light tracks the reflective element 4, the measurement light can be continuously irradiated to the reflective element 4 even if the reflective element 4 moves and the first imaging unit 23 can continuously image the reflective element 4.

In a process of tracking the reflective element 4 in the irradiation direction movement unit 201, the imaging adjustment unit iteratively executes image analysis to discriminate and capture an image of the reflective element 4 at each time.

In this way, the measurement light of the optical frequency comb interferometer 11 included in the distance measurement unit 200 is irradiated toward the reflective element 4 (step S130). When the measurement light is irradiated to the reflective element 4, the reflected light is reflected in total reflection.

In addition, the reflective element 4 may not be a total reflective element. For example, a corner cube reflector may be used as the reflective element 4. The corner cube reflector may be a reflective element of a corner cube having a reflection increasing film. As the reflective element 4, a ball reflector or a cat's eye may be used.

The reflected light from the reflective element 4 passes through the same path as the measurement light in the opposite direction and is received by the light reception unit of the distance measurement unit 200 including the optical frequency comb interferometer 11 (step S140). Also, a part of the reflected light is detected by the four-division PSD 12. On the basis of a detection result of the four-division PSD 12, the control unit 22 again controls the irradiation direction movement unit 201 so that the measurement light is continuously irradiated to the reflective element 4. Here, the control unit 22 finely adjusts the irradiation direction of the measurement light in the irradiation direction movement unit 201 on the basis of a detection result of the four-division PSD 12.

Also, in the position measurement device 1, by using the optical frequency comb interferometer 11, even if the reflected light is lost in the measurement process, the measurement can be continued with the accuracy of the order of sub-micrometers when the reflected light is subsequently received again and the measurement is restored.

The position information acquisition unit 203 acquires position information of the reflective element 4 from a detection result (distance information) of the distance measurement unit 200 including the optical frequency comb interferometer 11 and the direction information measured by the irradiation direction measurement unit 202 (step S150). The acquired position information is output to the calculation unit 26 via the control unit 22. The position information is expressed in three-dimensional spherical coordinates using the position measurement device 1 as a reference.

As described above, the position measurement unit 20 acquires position information of the reflective element 4 in the three-dimensional space from a distance to the reflective element 4 (distance information) measured by the distance measurement unit 200 and an irradiation direction (direction information) measured by the irradiation direction measurement unit 202.

The position measurement process will be continuously described with reference back to FIG. 5.

The reference position measurement unit 21 acquires reference position information of the reference reflective element 5 (step S20). The reference position measurement unit 21 irradiates reference measurement light to at least one reference reflective element 5, receives reference reflected light reflected by the reference reflective element 5, and acquires position information (reference position information) of the reference reflective element 5 in the three-dimensional space. Here, as described above, the position measurement device 1 includes a plurality of reference position measurement units 21. The plurality of reference reflective elements 5 acquire different position information of reference reflective elements 5.

Figure 7:
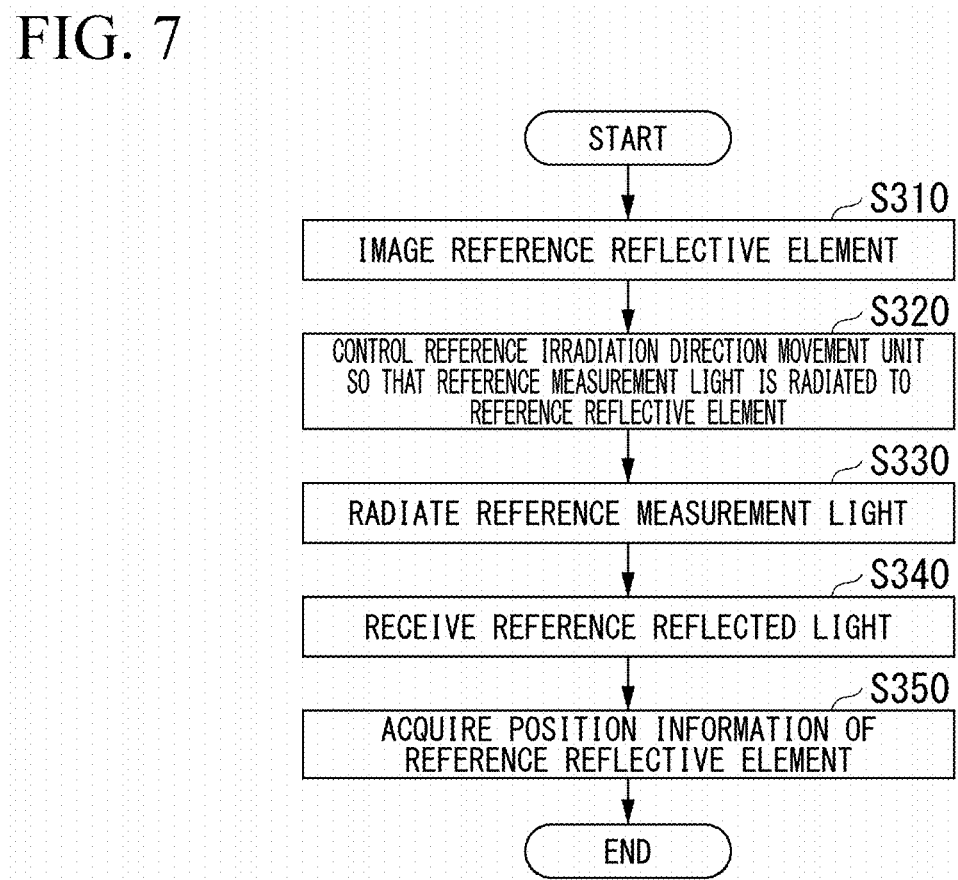
FIG. 7 is a diagram showing an example of a reference position information generation process according to the first embodiment.

Here, details of a process in which the reference position measurement unit 21-1 generates reference position information of the reference reflective element 5 (referred to as a reference position information generation process) will be described with reference to FIG. 7. FIG. 7 is a diagram showing an example of the reference position information generation process according to the present embodiment. The processing of steps S310 to S350 shown in FIG. 7 is executed as the processing of step S20 shown in FIG. 5.

The processing of steps S310 to S350 shown in FIG. 7 may be executed at the start of measurement.

The control unit 22 uses the first imaging unit 23 to capture images of a plurality of reference reflective elements 5 (step S310).

The control unit 22 controls each of the plurality of reference irradiation direction movement units 211 so that each of the three reference measurement light beams is irradiated to each of the plurality of reference reflective elements 5 (step S320). In the control of step S320, the control unit 22 uses results of capturing the images of the plurality of reference reflective elements 5 in the first imaging unit 23.

The control unit 22 controls the reference irradiation direction movement unit 211 so that a plurality of reference measurement light beams are irradiated to the plurality of reference reflective elements 5 (step S330). The control unit 22 may cause the plurality of reference irradiation units to irradiate reference measurement light simultaneously or sequentially.

The reflected light from the reference reflective element 5 passes through a path identical to that of the reference measurement light in the opposite direction and is received by the reference light reception unit provided in the reference distance measurement unit 210 (step S340).

The reference position information acquisition unit 213 acquires reference position information of the reference reflective element 5 from the measurement result (reference distance information) of the reference distance measurement unit 210 and the reference irradiation direction information acquired by the reference irradiation direction measurement unit 212 (step S350). In the present embodiment, the reference position generation process described here is performed in each of the reference position measurement unit 21-1, the reference position measurement unit 21-2, and the reference position measurement unit 21-3, and the first reference position information, the second reference position information, and the third reference position information are acquired. The acquired first, second, and third reference position information is output to the calculation unit 26 via the control unit 22. The reference position information is expressed by three-dimensional spherical coordinates using the position measurement device 1 as a reference.

As described above, the reference position measurement unit 21 acquires position information in the three-dimensional space of the reference reflective element 5 from the distance to the reference reflective element 5 measured by the reference distance measurement unit 210 and the irradiation direction of the reference measurement light measured by the reference irradiation direction measurement unit 212.

The position measurement process will be continuously described with reference back to FIG. 5.

The reference coordinate setting unit 260 provided in the calculation unit 26 sets a reference (origin) and a reference coordinate system on the basis of the first, second, and third reference position information acquired by the reference position measurement unit 21 and obtained via the control unit 22 (step S30). In the present embodiment, at least three reference position informations are acquired as the first to third reference position information and the reference coordinate setting unit 260 sets a desired Cartesian coordinate system (reference coordinate system) on the basis of the three reference position informations.

The reference coordinate system can be arbitrarily set in a space where the measurement target object (the reflective element 4) moves in accordance with installation positions of the first reference reflective element 5-1, the second reference reflective element 5-2, and the third reference reflective element 5-3. As a reference coordinate system, for example, as shown in FIG. 3, a Cartesian coordinate system can be set to include two axes parallel to a surface plate surface on which a measurement target object is placed with respect to a space where a movable unit T2, which is the measurement target object, moves. Further, the reference coordinate setting unit 260 sets a reference origin in the reference coordinate system. The origin may be any one of the three first reference reflective elements 5-1, the second reference reflective element 5-2, and the third reference reflective element 5-3 (reference positions).

Alternatively, the movable unit T2 (or the reflective element 4), which is the measurement target object, may be positioned at a predetermined position in the reference coordinate system, for example, at the origin of the movable unit T2 determined by the machine tool, and the position information of the reflective element 4 at that time may be caused to match the origin in the reference coordinate system. Thereby, the position information acquired by the position measurement unit 20 and the position information acquired by the reference position measurement unit 21 are the same position information with respect to the same position in the space and it is possible to eliminate (correct) the deviation between the position information acquired by the position measurement unit 20 and the position information acquired by the reference position measurement unit 21. In any case, there is no change in the reference coordinate system and the reference (origin) set on the basis of the reference position information obtained from the reference reflective element.

The first correction unit 261 provided in the calculation unit 26 converts the position information of the reflective element 4 into position information in the reference coordinate system (step S40). The first correction unit 261 converts the position information of the reflective element 4 measured by the position measurement unit 20 from the three-dimensional spherical coordinates using the position measurement device 1 as a reference into Cartesian coordinates in the reference coordinate system set by the reference coordinate setting unit 260. Thereby, in the space where the measurement target object moves, the position information of the measurement target object (i.e., the position information of the reflective element 4) can be acquired in Cartesian coordinates in the reference coordinate system.

Meanwhile, the relative positional relationship between the position measurement device 1 and the measurement target object (the reflective element 4) may change due to vibrations of the floor, vibrations due to the operation of the robot, or the like independent of the movement of the measurement target object. These are changes over time including both short-term changes (vibrations) and long-term changes (origin drift). Such a change in the relative position relationship results in a decrease in the position information measurement accuracy of the measurement target object in the position measurement device 1. Therefore, the first correction unit 261 corrects the position information of the reflective element 4 using reference position information of the reference reflective element 5 (step S50).

The correction may include resetting the reference (origin) and the reference coordinate system set in step S30. For example, after the acquisition of the position information is started, an operation similar to that of step S30 may be performed at regular time intervals or irregularly to acquire the deviation in the reference coordinate system and correct the deviation. Thereby, it is possible to calibrate a change in the origin over time (origin calibration).

Alternatively, the reference position information of the reference reflective element 5 may be acquired all the time and changes in the reference (origin) and the reference coordinate system may be corrected all the time. In this case, changes (vibrations) in a short time can also be corrected.

Thus, it is possible to cancel (correct) a change in a relative positional relationship between the position measurement device 1 and the measurement target object (the reflective element 4) by installing the reference reflective element 5 on a measurement reference object serving as a reference for measuring the position of the measurement target object and setting the reference coordinate system and the origin on the basis of the reference position information of the reference reflective element 5 acquired by the position measurement device 1. In this sense, it can also be said that the conversion of the position information of the reflective element 4 into position information in the reference coordinate system executed by the first correction unit 261 is also the correction of the position information of the reflective element 4.

The control unit 22 transmits the corrected position information to the control system (step S60).

As described above, the control unit 22 ends the position measurement process.

Modified Example 1 of First Embodiment

An example in which the reference reflective element 5 is arranged on a surface plate has been described in the present embodiment. As a modified example of the present embodiment, a case where the reference reflective element 5 is arranged on a workpiece will be described.

Figure 8:
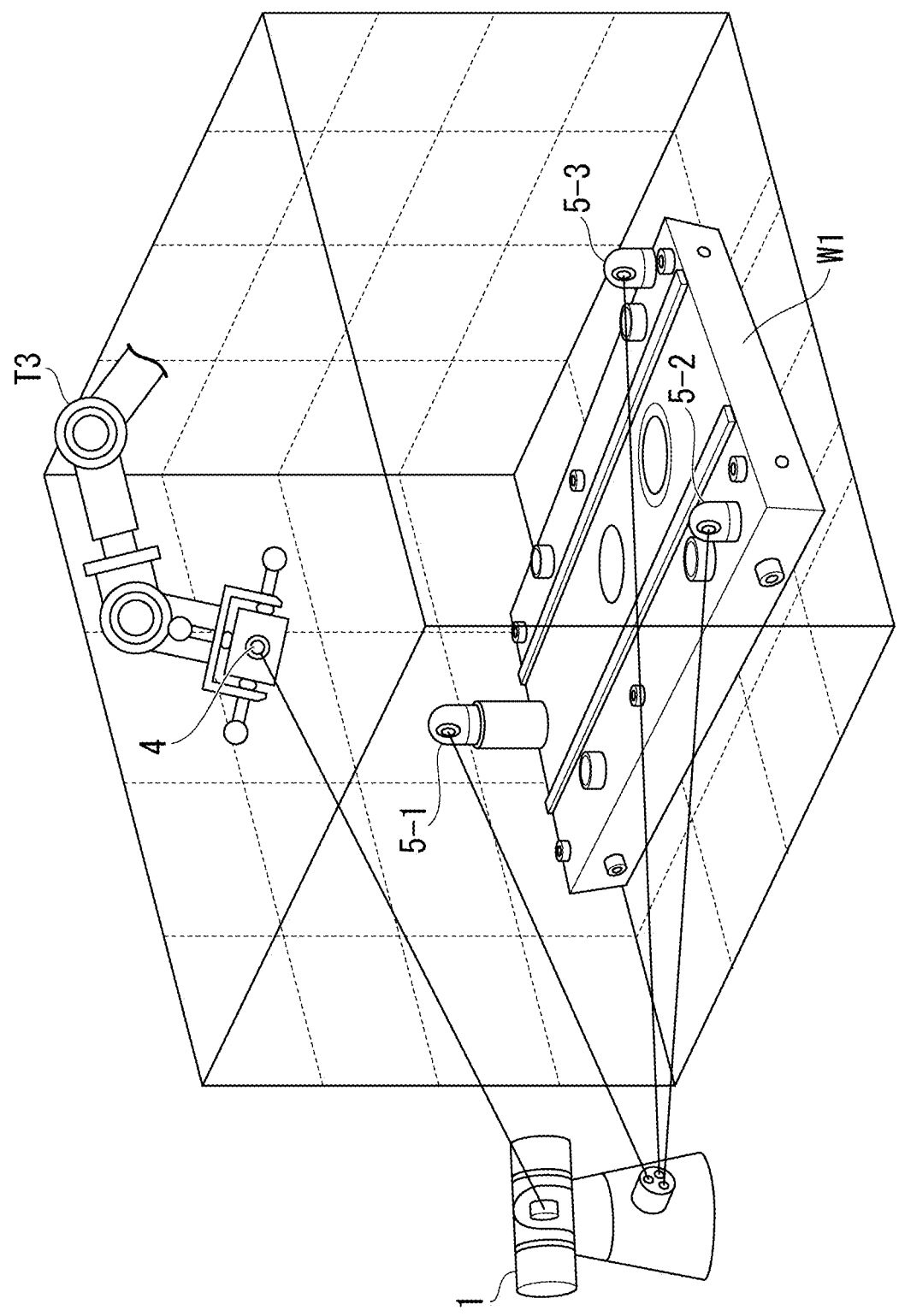
FIG. 8 is a diagram showing an example of a state in which a position measurement device according to a modified example of the first embodiment measures a reference position.

FIG. 8 is a diagram showing an example of a state in which the position measurement device 1 according to the present modified example measures a reference position. In FIG. 8, the position measurement device 1 is arranged in a processing device in which a robot T3 is provided. The robot T3 processes a workpiece W1 placed in the processing device.

The first reference reflective element 5-1, the second reference reflective element 5-2, and the third reference reflective element 5-3 are arranged on the workpiece W1. The workpiece W1 is a large workpiece having sufficiently high rigidity. If it is a large workpiece having sufficiently high rigidity such as the workpiece W1, the reference reflective element 5 may be arranged on the workpiece as shown in the present modified example.

Here, in the process in which the robot T3 processes the workpiece W1, the robot T3 may vibrate the position measurement device 1 via the housing of the processing device. Also, even if the position measurement device 1 is installed on the floor, the position measurement device 1 may be vibrated in the process of processing the workpiece W1 by the robot T3. Thus, the position measurement device 1 is preferably installed in a vibration-proof and/or vibration-controlled state. When the vibrations of the position measurement device 1 are prevented and/or suppressed, the position measurement device 1 and the workpiece W1 can be regarded as rigid bodies.

Modified Example 2 of First Embodiment

When ultra-high-precision three-dimensional coordinate measurement is implemented by the position measurement device 1, an influence of a change in a refractive index of the atmosphere due to changes in temperature, humidity, and atmospheric pressure in the measurement environment on an error in the measured value of the position information cannot be ignored. In the present modified example, a case where reference light is used to correct an error in position information due to a change in the refractive index will be described.

The temperature and air pressure of the environment can change over time. Due to changes in temperature and atmospheric pressure, the refractive index changes. In the position measurement device 1, because position information is acquired by the optical frequency comb interferometer 11, the change in the refractive index can be an error in the change in the position information of the reflective element.

Figure 9:
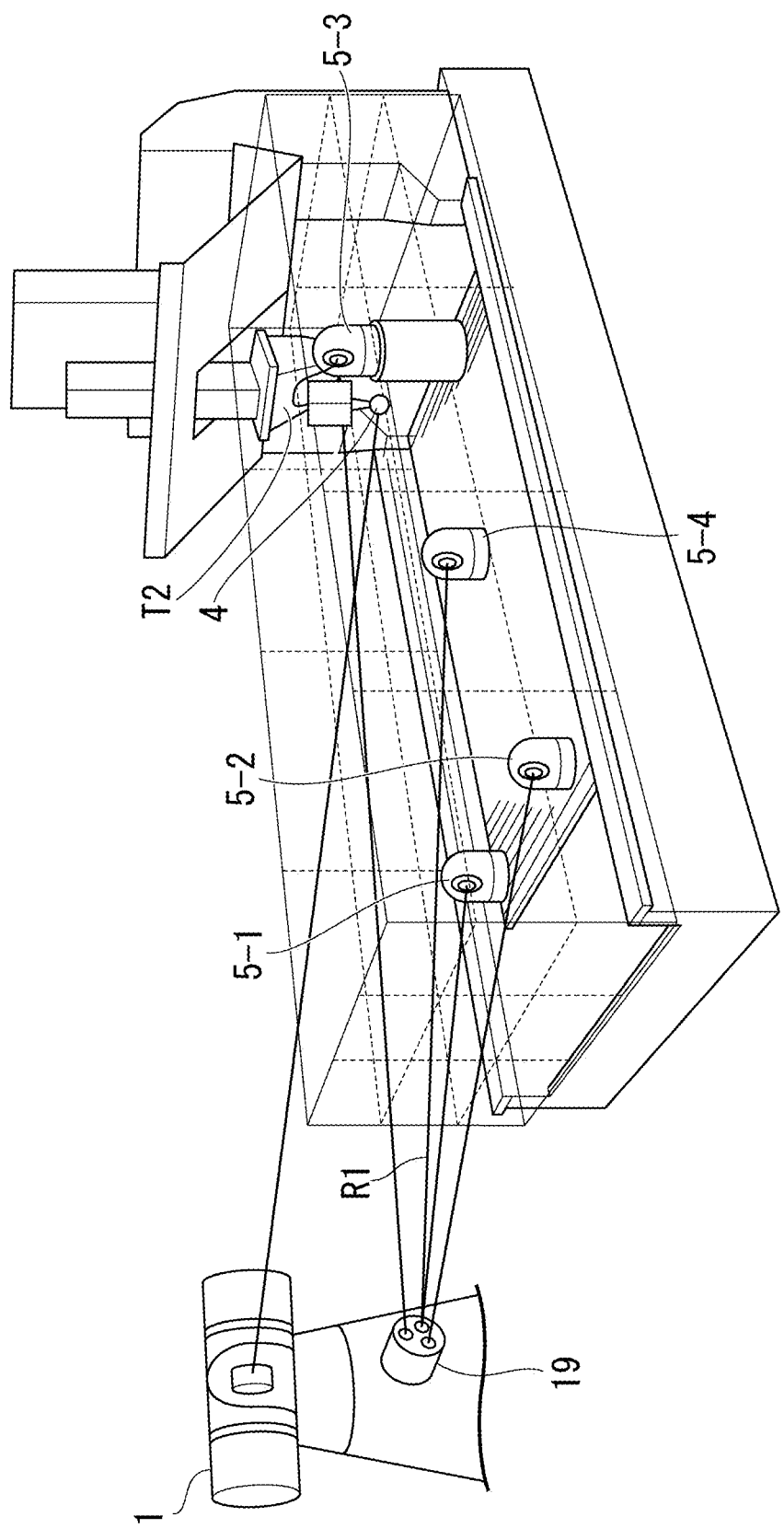
FIG. 9 is a diagram showing an example of a state in which the position measurement device according to the modified example of the first embodiment corrects an error in position information due to a change in a refractive index using reference light.

FIG. 9 is a diagram showing an example of a state in which the position measurement device 1 according to the present modified example corrects an error in position information due to a change in the refractive index using reference light R1. In FIG. 9, the reference reflective element 5-4 is arranged on a surface plate together with the first reference reflective element 5-1, the second reference reflective element 5-2, and the third reference reflective element 5-3. The configuration of the reference reflective element 5-4 is similar to those of the first reference reflective element 5-1, the second reference reflective element 5-2, and the third reference reflective element 5-3, except that its arrangement position is different from those of the first reference reflective element 5-1, the second reference reflective element 5-2, and the third reference reflective element 5-3.

The position measurement device 1 irradiates the reference light R1 from the reference measurement light irradiation unit 19 to the reference reflective element 5-4. In the present modified example, any one of the first reference irradiation unit, the second reference irradiation unit, and the third reference irradiation unit provided in the reference measurement light irradiation unit 19 irradiates the reference measurement light as the reference light R1. In the present modified example, as an example, the first reference irradiation unit irradiates the reference light R1.

In addition, the reference measurement light irradiation unit 19 may include a reference light irradiation unit that irradiates the reference light R1 separately from the first reference irradiation unit, the second reference irradiation unit, and the third reference irradiation unit. In this case, the reference light irradiation unit uses light into which the measurement light output from the optical frequency comb interferometer 11 is branched as the reference light R1. The position measurement device 1 includes a pulsed light source for irradiating the reference light R1 separately from the pulsed light source provided in the optical frequency comb interferometer 11 and the reference light irradiation unit may irradiate pulsed light output from the pulsed light source for irradiating the reference light R1 as the reference light R1.

The position measurement device 1 acquires information of a distance from the position measurement device 1 to the reference reflective element 5-4 on the basis of the reference light R1 irradiated to the reference reflective element 5-4 under a predetermined environment (which may be referred to as a reference environment in the following description). The predetermined environment (reference environment) is an environment indicated by the temperature and atmospheric pressure of the space where the reference reflective element 5-4 is arranged. The distance information to be acquired varies with the environment.

Although the reference reflective element 5-4 is arranged on a surface plate in the second modified example, the reflective element 4, the first reference reflective element 5-1, the second reference reflective element 5-2, and the third reference reflective element 5-3 may be arranged anywhere as long as a position is representative of an environment (temperature, atmospheric pressure, and the like) in which they are installed.

In an environment in which the position information of the reflective element 4 is measured (which may be referred to as the measurement environment in the following description), the position measurement device 1 acquires information of a distance from the position measurement device 1 to the reference reflective element 5-4 on the basis of the reference light R1 simultaneously with measurement of the position information of the reflective element 4. A distance between the position measurement device 1 and the reference reflective element 5-4 is known. The position measurement device 1 compares the distance information acquired in the measurement environment with known distance information of a distance to the reference reflective element 5-4 and calculates a ratio between the two (a correction factor). The position measurement device 1 multiplies the acquired position information of the reflective element 4 by the correction factor and corrects the position information. Thereby, the position measurement device 1 corrects an error in position information due to the change in the refractive index.

Although the first reference irradiation unit irradiates the reference light R1 to the reference reflective element 5-4 and compares it with a known distance in the present modified example, the present invention is not limited thereto. For example, a reference reflective element 5-5 is provided separately from the reference reflective element 5-4 and the first reference irradiation unit sequentially irradiates the reference light R1 to the reference reflective element 5-4 and the reference reflective element 5-5 to acquire position information. A relative positional relationship between the reference reflective element 5-4 and the reference reflective element 5-5 is known. Thereby, the correction factor can be calculated from the known relative positional relationship and the measured positional relationship between the reference reflective element 5-4 and the reference reflective element 5-5. Instead of the reference reflective elements 5-4 and 5-5, one or two of the first reference reflective element 5-1, the second reference reflective element 5-2, and the third reference reflective element 5-3 may be used for calculating the correction factor.

As described above, in the present modified example, the position measurement device 1 corrects the position information of the reflective element 4 measured by the position measurement unit 20 using the position information of the reference reflective element 5 acquired by the reference position measurement unit 21. Here, the correction includes correcting a change in the position information of the reflective element 4 over time. Also, the correction includes correcting the error in the position information of the reflective element 4 due to the temperature and atmospheric pressure of the space where the reflective element 4 and the reference reflective element 5 are arranged on the basis of the position information of the reference reflective element 5 acquired by the reference position measurement unit 21.

Also, the position measurement device 1 may acquire position information of the robot arm provided in a coordinate measuring machine (CMM). In this case, the reflective element 4 is provided in the movable unit of the robot arm. The reference reflective element 5 is provided, for example, on the floor of the CMM. The floor of the CMM is a part different from the robot arm in the CMM configuration. The robot arm and the floor of the CMM constitute the CMM.

That is, the measurement target object and the measurement reference object constitute one device. In this case, the position measurement device 1 can determine a device coordinate system serving as a reference for the position information of the measurement target object in the one device on the basis of the position information of the reference reflective element 5 acquired by the reference position measurement unit 21 and can calibrate or correct a device coordinate system provided in a three-dimensional measuring machine itself, which is one device, in the position measurement device 1.

As described above, the position measurement device 1 according to the present embodiment and its modified example includes a position measurement unit 20 and a reference position measurement unit 21.

The position measurement unit 20 irradiates measurement light to the reflective element 4, receives reflected light reflected by the reflective element 4, and acquires position information of the reflective element 4 in the three-dimensional space.

The reference position measurement unit 21 irradiates reference measurement light to at least one reference reflective element 5, receives reference reflected light reflected by the reference reflective element 5, and acquires position information of the reference reflective element 5 in the three-dimensional space.

The position measurement device 1 corrects the position information of the reflective element 4 measured by the position measurement unit 20 using the position information of the reference reflective element 5 acquired by the reference position measurement unit 21.

With this configuration, the position measurement device 1 according to the present embodiment and its modified example can improve the accuracy of the position information as compared with a case where a correction process is not performed because it is possible to correct the position information of the reflective element 4 using the position information of the reference reflective element 5.

For example, the position measurement device 1 can measure the position information of the reflective element 4 installed in the robot in the control of the robot and measure the position of the robot with high accuracy by correcting the position information.

Also, the position measurement device 1 according to the present embodiment and its modified example includes a first position measurement unit (the position measurement unit 20 in the present embodiment) and a second position measurement unit (the reference position measurement unit 21 in the present embodiment).

The first position measurement unit (the position measurement unit 20 in the present embodiment) irradiates first measurement light (measurement light in the present embodiment) to the reflective element 4, receives first reflected light (reflected light in the present embodiment) reflected by the reflective element 4, and acquires position information of the reflective element 4 in a three-dimensional space.

The second position measurement unit (the reference position measurement unit 21 in the present embodiment) irradiates second measurement light (reference measurement light in the present embodiment) to the reflective element, receives second reflected light (reference reflected light in the present embodiment) reflected by the reflective element 4, and acquires position information of the reflective element 4 in a three-dimensional space.

With this configuration, the position measurement device 1 according to the present embodiment can improve the accuracy of the position information as compared with a case where only the first measurement light is used because it is possible to irradiate the first measurement light and the second measurement light to the reflective element 4 to acquire position information of the reflective element 4 in the three-dimensional space.

Second Embodiment

Hereinafter, a second embodiment of the present invention will be described in detail with reference to the drawings.

In the above-described first embodiment, the case where the position measurement device 1 corrects the change in the distance between the position measurement device 1 and the reference position or the error in the position information of the reflective element due to the temperature and atmospheric pressure of the space has been described. In the present embodiment, a case where position information is corrected on the basis of an input angle at which measurement light is input to a reflective element, an input position where the measurement light is input to an input surface, or the like will be described.

The position measurement device according to the present embodiment is referred to as a position measurement device 1a.

In addition, components identical to those of the first embodiment described above may be denoted by the same reference signs and description of the same components and operations may be omitted.

Figure 10:
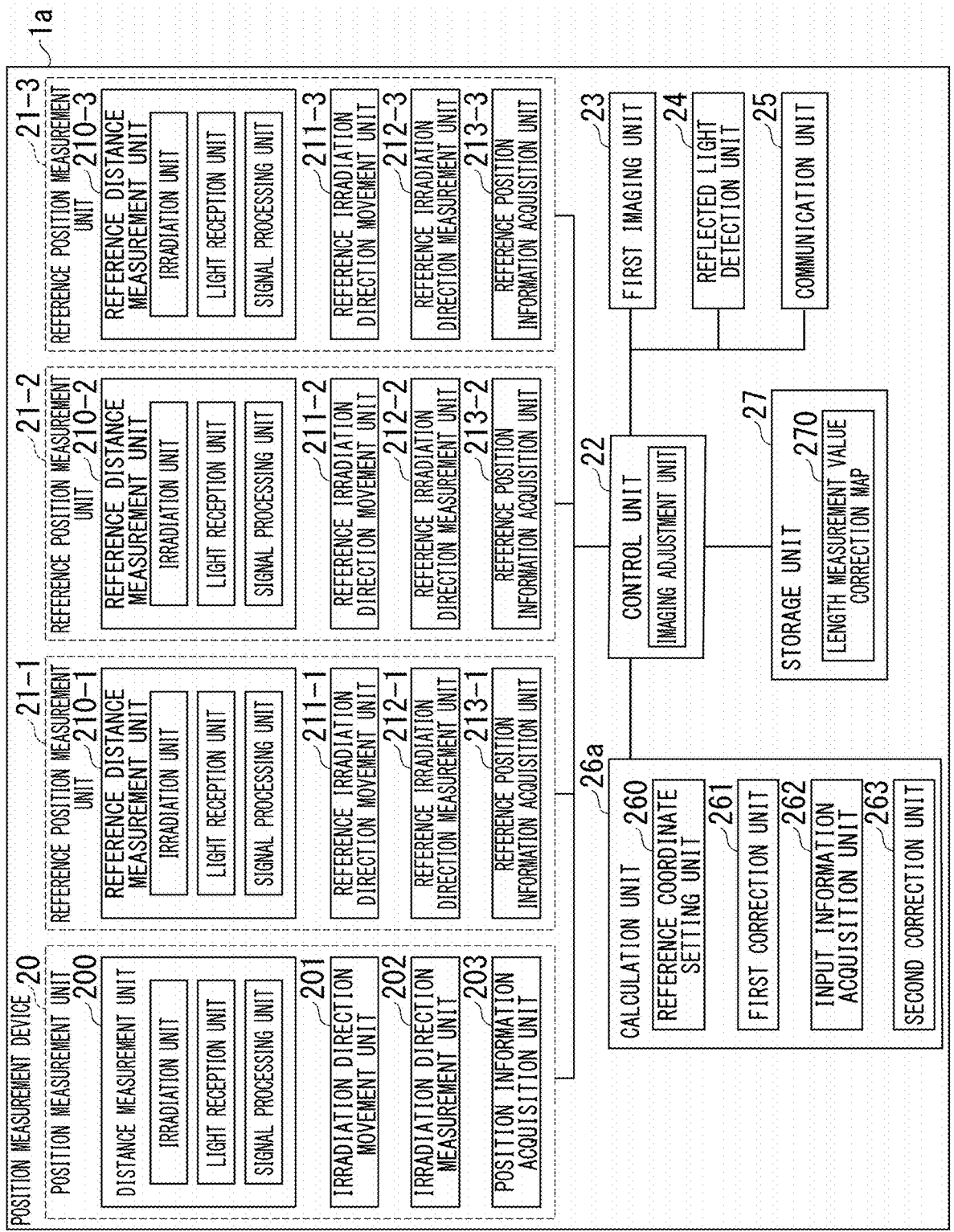
FIG. 10 is a diagram showing an example of a functional configuration of a position measurement device according to a second embodiment.

FIG. 10 is a diagram showing an example of a functional configuration of the position measurement device 1a according to the present embodiment. The position measurement device 1a includes a position measurement unit 20, a reference position measurement unit 21, a control unit 22, a first imaging unit 23, a reflected light detection unit 24, a communication unit 25, a calculation unit 26a, and a storage unit 27.

The calculation unit 26a includes a reference coordinate setting unit 260, a first correction unit 261, an input information acquisition unit 262, and a second correction unit 263.

The input information acquisition unit 262 acquires input information from an image of the reflective element 4 imaged by the first imaging unit 23. The input information is information about the input of the measurement light. The input information includes an input angle at which the measurement light is input to an input surface of the reflective element 4. Also, the input information includes an input position in the input surface of the reflective element 4 to which the measurement light is input.

The second correction unit 263 corrects position information acquired by the position measurement unit 20 on the basis of the input information acquired by the input information acquisition unit 262.

The storage unit 27 stores various types of information. In the storage unit 27, the length measurement value correction map 270 is stored in advance before the position measurement device 1a starts measurement. The length measurement value correction map 270 is information in which a set of an input angle at which the measurement light is input to the input surface of the reflective element 4 and an input position in the input surface is associated with a correction amount according to an error caused by the reflective element 4. The error caused by the reflective element 4 is, for example, an error due to an individual difference during the manufacture of the reflective element 4.

In addition, the length measurement value correction map 270 may be stored in an external device such as a server. In this case, the input information acquisition unit 262 acquires the length measurement value correction map 270 from the external device by communicating with the external device via the communication unit 25. Alternatively, it may be stored in the storage area provided in the second correction unit 263.

A relationship between an input angle at which the measurement light is input to the input surface of the reflective element 4 and an optical path length will be described with reference to FIGS. 11 to 13.

In the present embodiment, in order to reduce the change in the optical path length due to the input angle of the measurement light, the center of rotation of a prism 41 provided in the reflective element 4 is changed (shifted) to calculate an optical path length difference.

Figure 11:
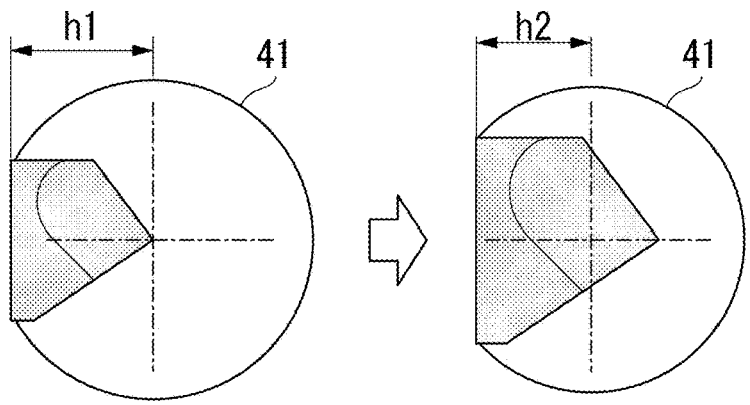
FIG. 11 is a diagram showing an example of a cross-section of a prism provided in a reflective element according to the second embodiment.

FIG. 11 is a diagram showing an example of a cross-section of the prism 41 provided in the reflective element 4 according to the present embodiment. In FIG. 11, a cross-section of a case where the height of the prism 41 is a height h1 and a cross-section of a case where the height of the prism 41 is a height h2 are shown. The height h2 is calculated by correcting the height h1 according to a refractive index n of the prism on the basis of Eq. (1).

[Math. 1]

$$h' = h\left(1 - \frac{1}{n}\right) \quad (1)$$

Correcting the center of rotation of the prism 41 from the position of height h1 to the position of height h2 corresponds to converting the center of rotation of the prism 41 into a conversion position obtained by performing the conversion into a value in air where no difference in the optical path length occurs.

When the center of rotation of the prism 41 is changed from the height h1 to the height h2 to calculate the optical path length difference, the optical path length difference for the input angle can be reduced. FIG. 12 is a diagram showing an example of the optical path length difference for the input angle according to the present embodiment. In FIG. 12, an optical path length difference for the input angle when the center of rotation of the prism 41 is set to the height h1 (when there is no shift) and an optical path length difference for the input angle when the center of rotation of the prism 41 is set to the height h2 (when there is a shift) are shown. FIG. 13 shows a graph in which the graph shown in FIG. 12 is expanded with respect to the axis of the optical path length difference.

Figure 12:
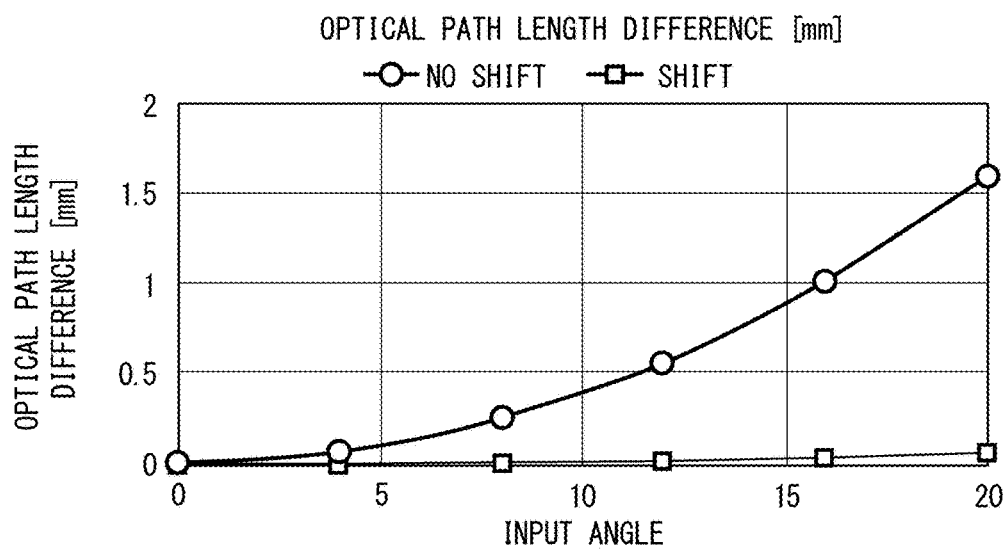
FIG. 12 is a diagram showing an example of an optical path length difference for an input angle according to the second embodiment.
Figure 13:
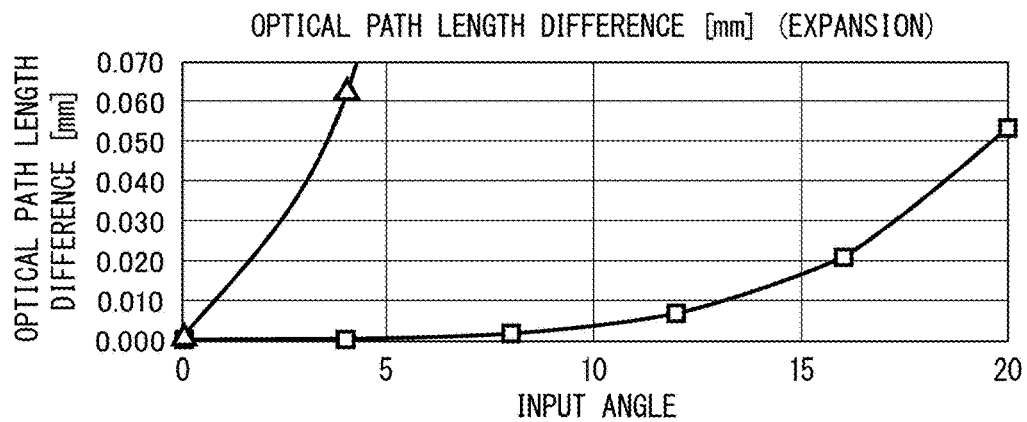
FIG. 13 is a diagram showing an example of a graph in which a graph showing the optical path length difference for the input angle is expanded with respect to an axis of the optical path length difference according to the second embodiment.

As shown in FIGS. 12 and 13, the optical path length difference can be reduced in a case where the center of rotation of the prism 41 is changed from the height h1 to the height h2 as compared to a case where the center of rotation of the prism 41 is not changed from the height h1 to the height h2. Even if there is a shift, the optical path length difference cannot be suppressed to zero for all the values of the input angle. As shown in FIG. 13, even if there is a shift, when the input angle is 20 degrees, the optical path length difference is about 50 micrometers.

Figure 14:
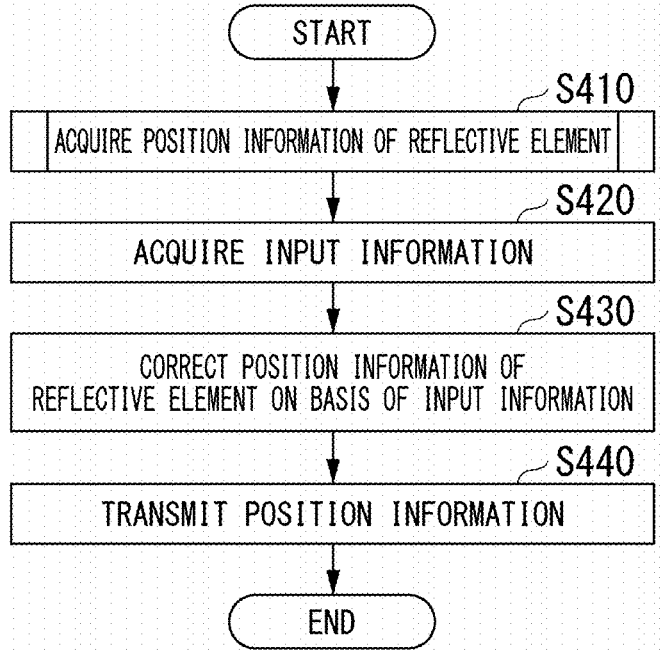
FIG. 14 is a diagram showing an example of a position measurement process according to the second embodiment.

Next, a position measurement process of the position measurement device 1a will be described with reference to FIG. 14. FIG. 14 is a diagram showing an example of the position measurement process according to the present embodiment. The position measurement process is executed by the control unit 22.

The position measurement unit 20 acquires position information of the reflective element 4 (step S410). The position measurement unit 20 irradiates measurement light to the input surface of the reflective element 4, receives reflected light, and acquires position information of the reflective element 4 in the three-dimensional space. Because details of the position measurement process of step S410 are similar to those of the position measurement process of step S10 shown in FIG. 5, description thereof will be omitted.

The input information acquisition unit 262 acquires input information (step S420). The first imaging unit 23 captures an image of the reflective element 4 to which the measurement light is input. The input information acquisition unit 262 acquires input information from an image of the reflective element 4 imaged by the first imaging unit 23.

A process in which the input information acquisition unit 262 acquires input information from the image of the reflective element 4 will be described with reference to FIGS. 15 to 20.

Figure 15:
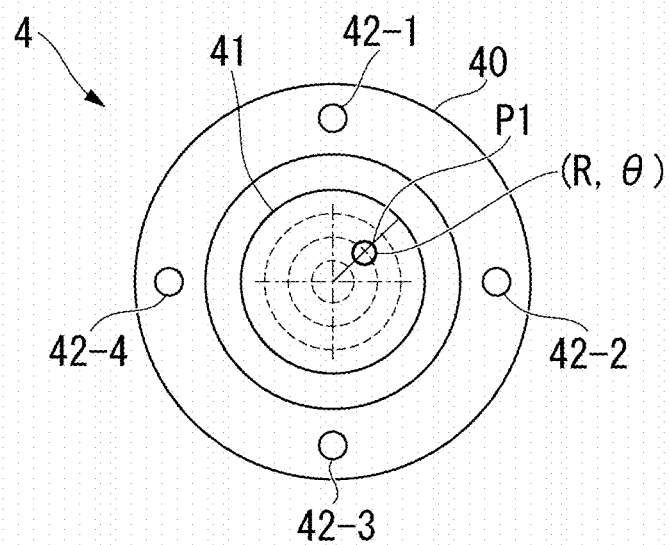
FIG. 15 is a diagram showing an example of a front surface of a reflective element according to the second embodiment.

FIG. 15 is a diagram showing an example of a front surface of the reflective element 4 according to the present embodiment. The reflective element 4 includes a holder unit 40 and a marker unit 42. The marker unit 42 includes a marker unit 42-1, a marker unit 42-2, a marker unit 42-3, and a marker unit 42-4.

The holder unit 40 holds the prism 41 and the marker unit 42. The shape of the holder unit 40 is a concentric circle when viewed from the front.

The marker unit 42 is, as an example, a light-emitting diode (LED). The number of marker units 42 is not limited to four, and can be any number of three or more under the condition that the marker units 42 are not on the same line. In addition, the marker unit 42 may be replaced with an LED, and a predetermined portion of an area of the holder unit 40 may be painted with paint and provided in the holder unit 40. The color of the LED or the color of the paint may be any color as long as an area where the marker unit 42 is provided in the holder unit 40 and other areas can be identified. Also, the marker unit 42 is not limited to a plurality of discrete points. A continuous or intermittent line can be the marker unit 42, and may be, for example, a circular light-emitting portion or paint surrounding the input surface of the reflective element 4.

In FIG. 15, measurement light output from the position measurement device 1 is input at a position P1 on the input surface of the prism 41 provided in the reflective element 4. The position P1 is shown using two-dimensional polar coordinates (R, θ) in the input surface.

Figure 16:
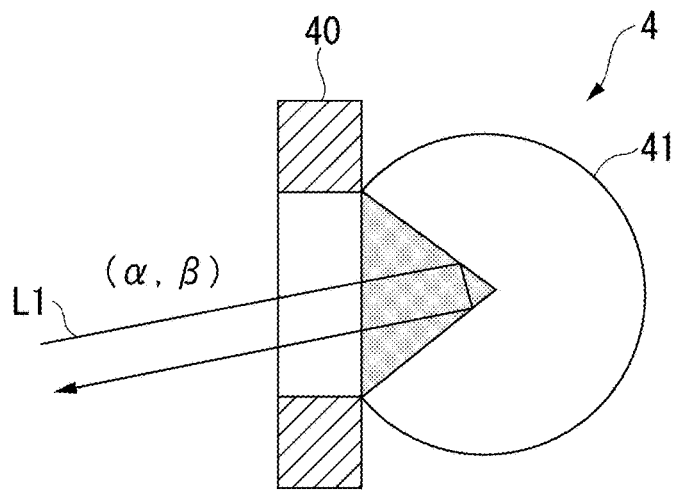
FIG. 16 is a diagram showing an example of a state in which measurement light is input to the reflective element according to the second embodiment.
Figure 17:
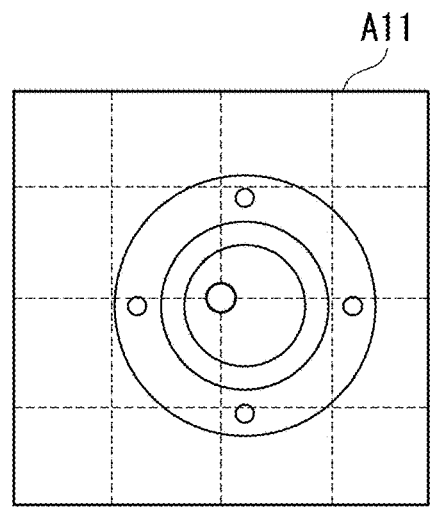
FIG. 17 is a diagram showing an example of a captured image captured by a coaxial camera according to the second embodiment.
Figure 18:
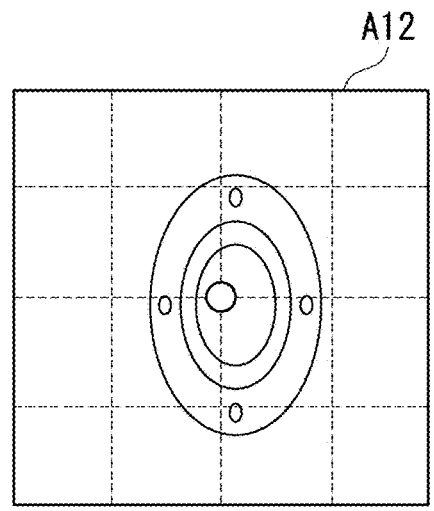
FIG. 18 is a diagram showing an example of a captured image captured by the coaxial camera according to the second embodiment.
Figure 19:
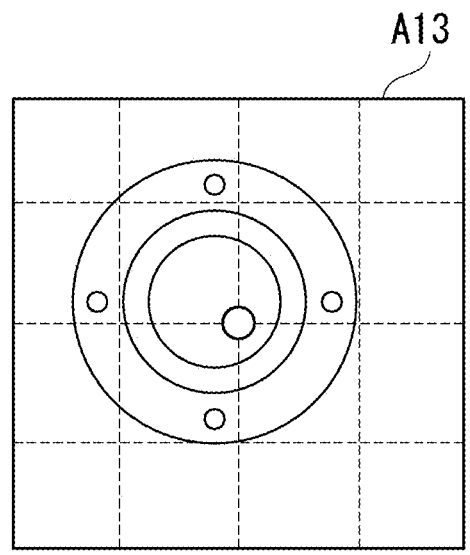
FIG. 19 is a diagram showing an example of a captured image captured by the coaxial camera according to the second embodiment.
Figure 20:
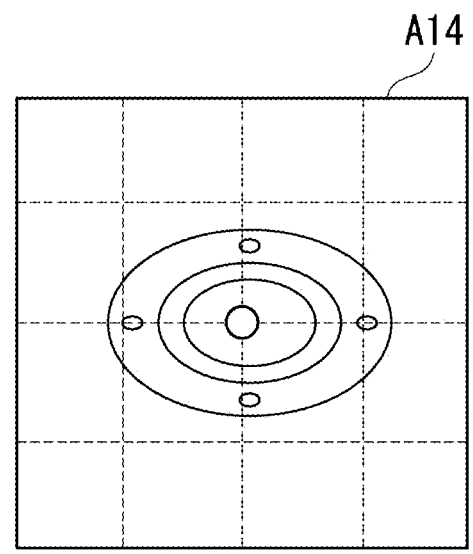
FIG. 20 is a diagram showing an example of a captured image captured by the coaxial camera according to the second embodiment.

FIG. 16 is a diagram showing an example of a state in which measurement light L1 is input to the reflective element 4 according to the present embodiment. In FIG. 16, a cross-section of each of the holder unit 40 and the prism 41 provided in the reflective element 4 is shown. In FIG. 16, the measurement light L1 is input to the prism 41 at an input angle indicated by an angle (α, β). Here, the angle α and the angle β are an azimuth angle and an elevation angle of the input surface when three-dimensional spherical coordinates are used, respectively.

FIGS. 17, 18, 19, and 20 show a captured image A11, a captured image A12, a captured image A13, and a captured image A14 captured by the coaxial camera 13, respectively. In the captured image A11, the captured image A12, the captured image A13, and the captured image A14, the image of the reflective element 4 when the measurement light is input to the input surface of the reflective element 4 at different positions and angles is captured.

As described above, the imaging direction of the coaxial camera 13 matches the direction of the measurement light. Therefore, in the captured image captured by the coaxial camera 13, the image of the reflective element 4 differs in shape in accordance with the input angle on the input surface of the measurement light. The input information acquisition unit 262 calculates the input angle on the basis of the shape of the input surface in the image of the reflective element 4 captured by the first imaging unit 23. Also, the input position on the input surface of the measurement light is acquired from the image. In the present embodiment, because the imaging center of the coaxial camera 13 matches the optical axis of the measurement light, the position of the reflective element 4 is imaged differently in accordance with the input position on the input surface of the measurement light.

For example, the captured image A11 is a captured image captured by the coaxial camera 13 when the measurement light is input from the front of the reflective element 4. In the captured image A11, the shape of the image of the reflective element 4 is substantially circular.

The captured image A12 is a captured image captured by the coaxial camera 13 when the measurement light is obliquely input in the horizontal direction of the reflective element 4. In the captured image A12, the shape of the image of the reflective element 4 is elliptical.

The captured image A13 is a captured image captured by the coaxial camera 13 when the measurement light is input from the front of the reflective element 4. In the captured image A13, the shape of the image of the reflective element 4 is substantially circular as in the captured image A11. The input position of the measurement light differs between the captured image A13 and the captured image A11.

Also, the captured image A14 is a captured image captured by the coaxial camera 13 when the measurement light is obliquely input in the vertical direction of the reflective element 4. In the captured image A14, the shape of the image of the reflective element 4 is elliptical.

The position measurement process will be continuously described with reference back to FIG. 14.

The second correction unit 263 corrects position information of the reflective element 4 on the basis of input information (step S430). Here, the second correction unit 263 reads the length measurement value correction map 270 from the storage unit 27. The second correction unit 263 reads a correction amount corresponding to the set of the input angle and the input position indicated by the input information acquired by the input information acquisition unit 262 from the length measurement value correction map 270. The second correction unit 263 corrects the position information acquired by the position measurement unit 20 on the basis of the read correction amount.

As described above, the position information acquired by the position measurement unit 20 includes a distance measured by the distance measurement unit 200. That is, in the correction process of the second correction unit 263, the distance measured by the distance measurement unit 200 is corrected.

Figure 21:
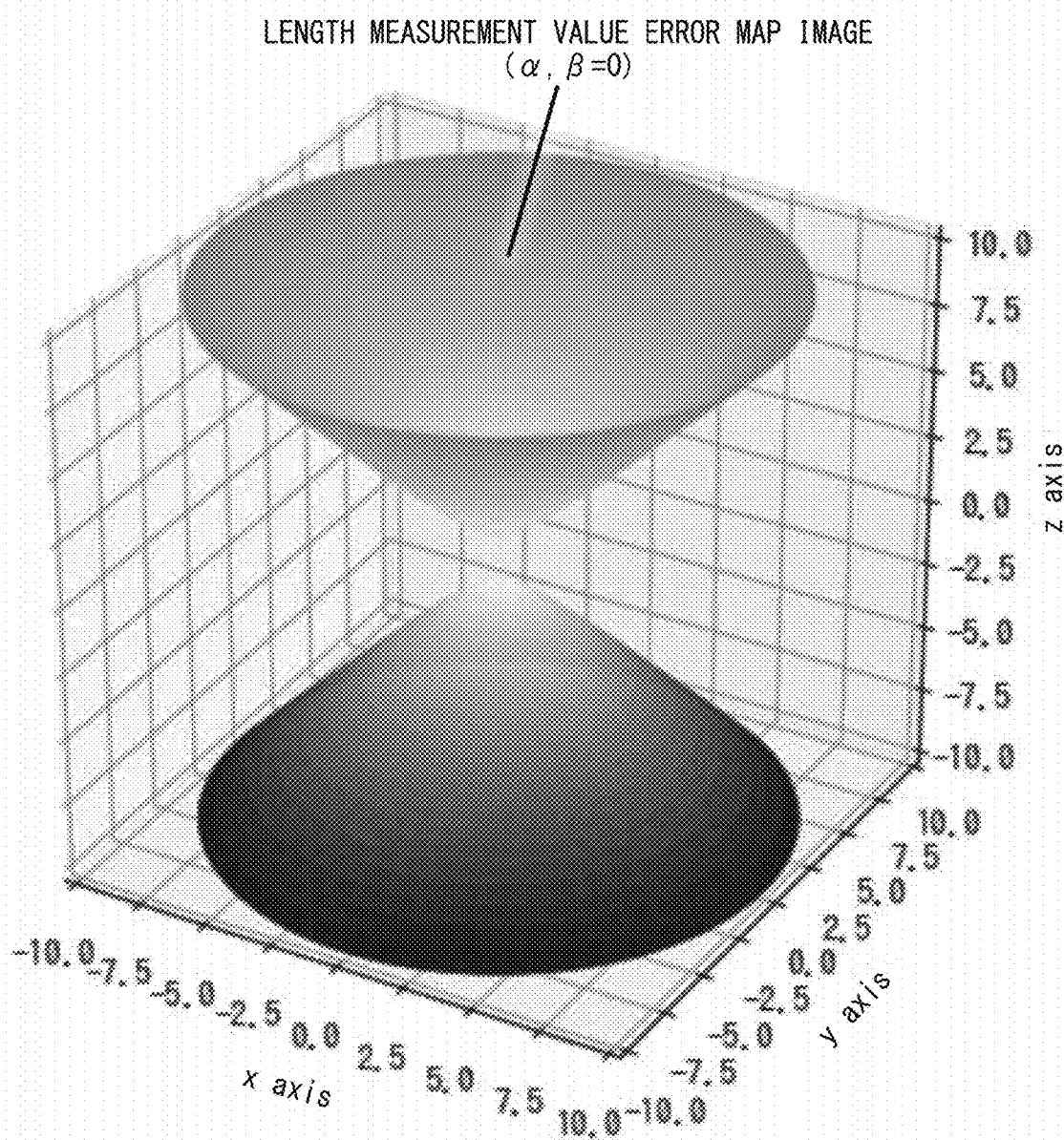
FIG. 21 is a diagram showing an example of a length measurement value correction map according to the second embodiment.

Here, the length measurement value correction map 270 will be described with reference back to FIG. 21. FIG. 21 is a diagram showing an example of the length measurement value correction map 270 as a three-dimensional graph according to the present embodiment. In FIG. 21, a coordinate value of the input position when the input angle is 0 degrees for each of the azimuth and elevation angles is shown as a curved surface.

The position measurement process will be described with reference back to FIG. 14.

The control unit 22 transmits corrected position information to the control system (step S440).

As described above, the control unit 22 ends the position measurement process.

Modified Example of Second Embodiment

The configuration of the holder unit and the marker unit of the reflective element is not limited to those shown in FIG. 15. In the present modified example, a case where the reflective element has a configuration that is easily recognized in image recognition with respect to the configuration of the holder unit and the marker unit will be described.

Figure 22:
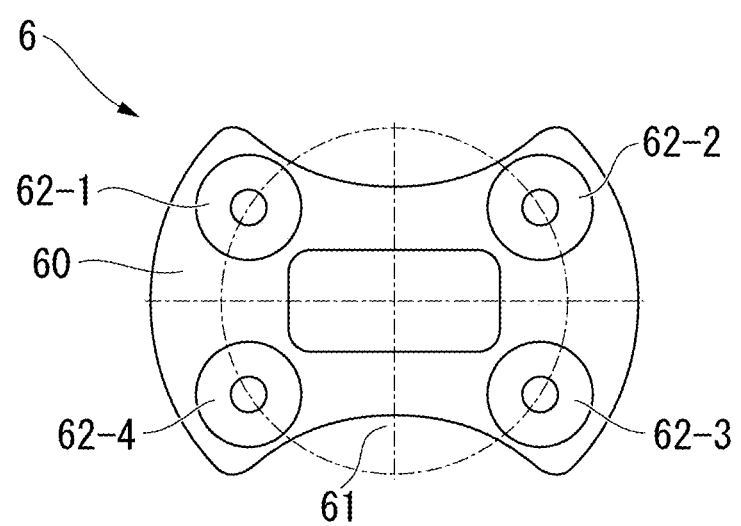
FIG. 22 is a diagram showing an example of a configuration of a reflective element according to a modified example of the second embodiment.

FIG. 22 is a diagram showing an example of the configuration of the reflective element 6 according to the present modified example. The reflective element 6 includes a holder unit 60, a prism 61, and a marker unit 62. The marker unit 62 includes a marker unit 62-1, a marker unit 62-2, a marker unit 62-3, and a marker unit 62-4.

The shape of the holder unit 60 is different from a simple shape so that it can be easily recognized in image recognition. The shapes of the marker unit 62 are concentric circles. Each concentric circle of the marker unit 62 is painted in a color different from the paint color on the surface of the holder unit 60. The color of the concentric circle of the holder unit 60 preferably has a predetermined contrast difference or more with respect to the color of the paint on the surface of the holder unit 60 in terms of ease of recognition in image recognition. For example, the surface of the holder unit 60 is painted in yellow and the concentric circle of the holder unit 60 is painted in black.

Third Embodiment

In the two embodiments described above, the case where the measurement light is irradiated to one reflective element 4 and the position information is acquired has been described. In the present embodiment, a case where a plurality of reflective elements 4 are installed on a measurement target object and posture information is acquired together with position information of the measurement target object will be described.

Figure 23:
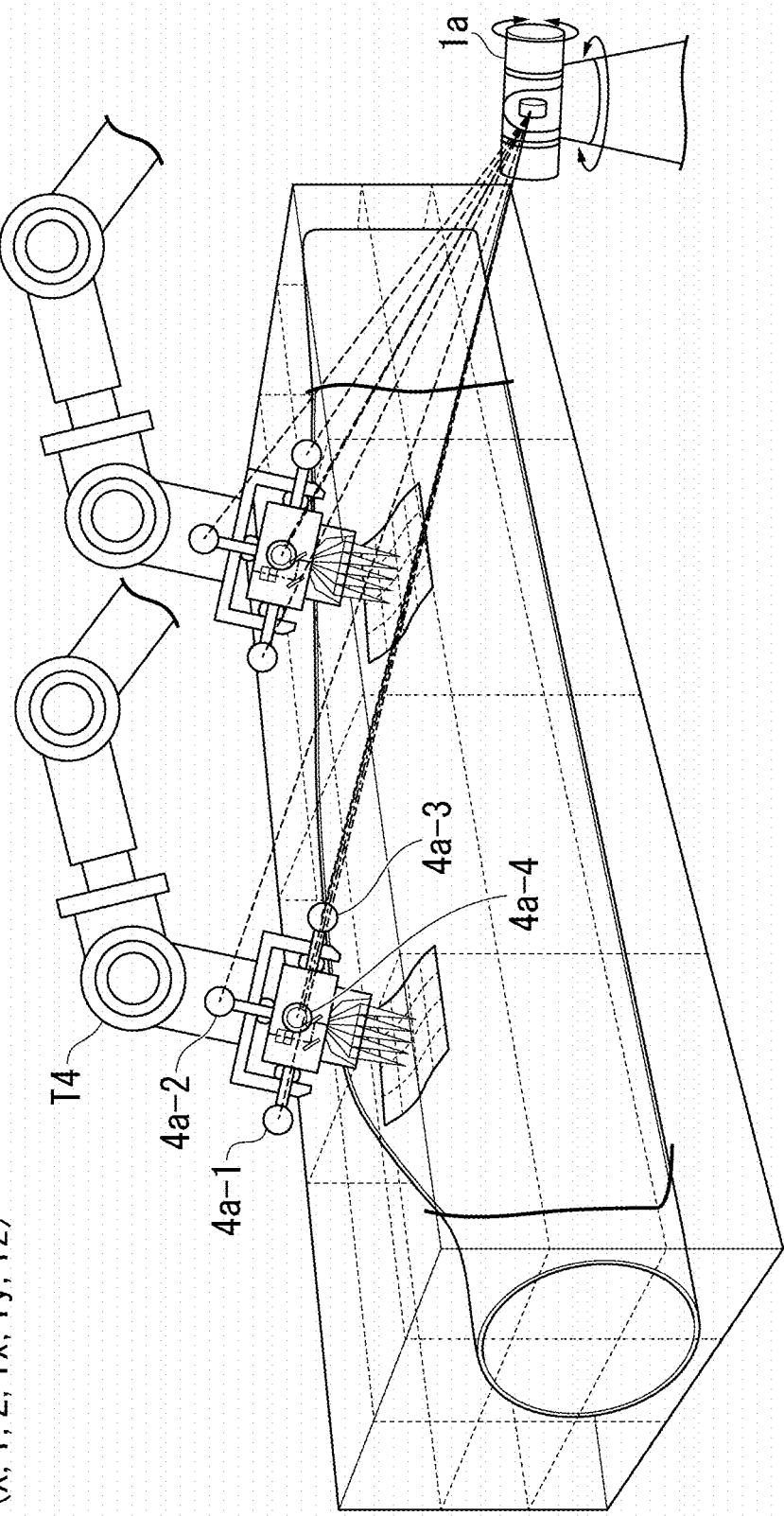
FIG. 23 is a diagram showing an example of a state in which a position measurement device according to a third embodiment measures a position of a measurement target.

FIG. 23 is a diagram showing an example of a state in which a position measurement device 1a according to the present embodiment measures a position of a measurement target. The position measurement device 1a may be the position measurement device 1 described in the first embodiment. In FIG. 23, the measurement target is a robot T4 as an example. The robot T4 includes a plurality of reflective elements 4a in a movable unit.

In FIG. 23, the reflective elements 4a include a reflective element 4a-1, a reflective element 4a-2, a reflective element 4a-3, and a reflective element 4a-4. Each of the reflective element 4a-1, the reflective element 4a-2, the reflective element 4a-3, and the reflective element 4a-4 is installed in a known positional relationship at different positions from each other in the movable unit of the robot T4. The plurality of reflective elements 4a are preferably installed so that distances between the reflective elements 4a are greater than or equal to a predetermined distance.

Figure 24:
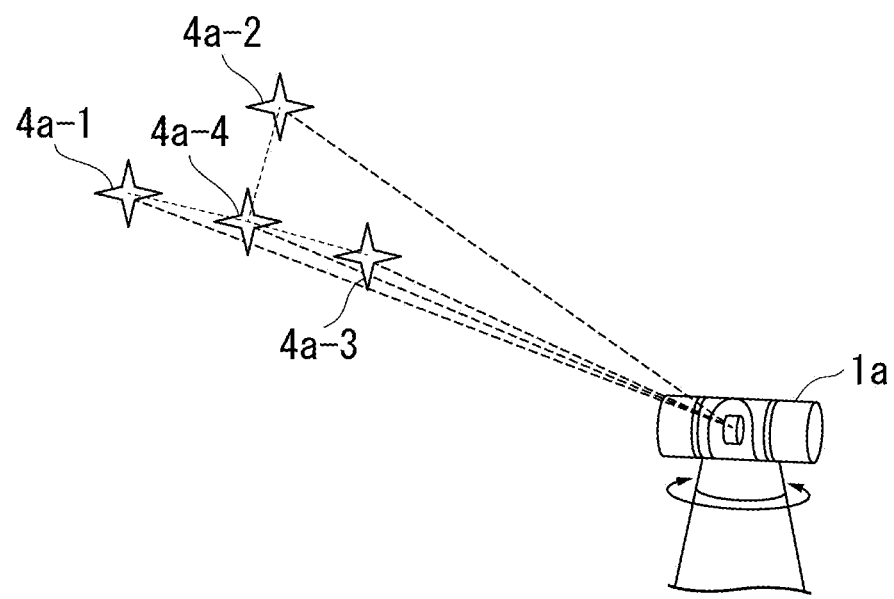
FIG. 24 is a diagram showing an example of a state in which the position measurement device according to the third embodiment images a plurality of marker units provided in a plurality of reflective elements.

FIG. 24 is a diagram showing an example of a state in which the position measurement device 1a images each of the plurality of reflective elements 4a. The position measurement device 1a images the plurality of reflective elements 4a with the coaxial camera 13. Here, the irradiation direction movement unit 201 moves (changes) an imaging direction of the coaxial camera 13 so that the plurality of reflective elements 4a are included in an imaging range. In FIG. 24, the position measurement device 1a images all of the reflective element 4a-1, the reflective element 4a-2, the reflective element 4a-3, and the reflective element 4a-4 in the imaging range of the coaxial camera 13.

In the present embodiment, the position measurement device 1a moves the irradiation direction movement unit 201 to sequentially irradiate measurement light to the plurality of reflective elements 4a on the basis of the images of the plurality of reflective elements 4a imaged by the coaxial camera 13, thereby acquiring position information of the plurality of reflective elements 4a in a three-dimensional space. When the measurement light is moved between the reflective elements 4a, a measured value of the optical frequency comb interferometer 11 is not lost (interrupted) even if the reflected light is temporarily interrupted. Because the positional relationship of the plurality of reflective elements 4a and the positional relationship of the measurement target object and the plurality of reflective elements 4a are known, the position and posture of the measurement target object can be acquired from the position information of the plurality of reflective elements 4a in the three-dimensional space. In this way, the position measurement device 1a acquires posture information of the measurement target object on the basis of the distance corresponding to each of the plurality of reflective elements 4 measured by the distance measurement unit 200 and the irradiation direction of the irradiation direction movement unit 201 at the time of measurement of each of the plurality of distances.

Although an example in which all of the plurality of reflective elements 4a are imaged by the coaxial camera 13 has been described in FIG. 24, the present invention is not limited thereto. A wide-angle camera may also be provided separately from the coaxial camera 13 and the wide-angle camera may ascertain approximate positions of the plurality of reflective elements 4a, subsequently move the irradiation direction movement unit 201, sequentially images the plurality of reflective elements 4a with the coaxial camera 13, irradiate the measurement light, and acquire position information of the reflective elements 4a.

In addition, the position measurement device 1a may calculate the input angle of the measurement light input to the plurality of reflective elements 4a using the posture information obtained from the position information of the plurality of reflective elements 4a provided in the robot T4 and correct the position information of the plurality of reflective elements 4a in the method described in the second embodiment on the basis of the calculated input angle.

In addition, at least one of the reflective elements 4a may be provided as a reference reflective element on a measurement reference object different from the measurement target object. In this case, the position measurement device 1a can acquire the position information of the measurement target object for the measurement reference object on the basis of the position information of the reflective element 4a as the reference reflective element even if the reference position measurement unit 21 is not provided. Furthermore, if at least three reflective elements 4a are installed on the measurement target object, posture information of the measurement target object can also be acquired.

Also, the position measurement device 1a may acquire relative position information of the reflective element 4a using the position information of the reference reflective element as a reference. In this case, at least three reference reflective elements are provided and the position measurement device 1a acquires the position information of the reflective element 4a with respect to a reference point set using position information of at least three reference reflective elements.

Also, the position measurement device 1a may determine a reference coordinate system including a reference point based on the position information of at least three reference reflective elements and acquire the position information of the reflective element 4a in the reference coordinate system.

Also, the position measurement device 1a may correct the position information of the reflective element 4a on the basis of a time change of the position information of the reference reflective element acquired by the position measurement unit 20.

As described above, the position measurement device 1a according to the second and third embodiments includes a position measurement unit 20, an imaging unit (a first imaging unit 23 in the present embodiment), and an input information acquisition unit 262.

The position measurement unit 20 irradiates measurement light to an input surface of the reflective element 4, receives reflected light, and acquires position information of the reflective element 4 in a three-dimensional space.

The imaging unit (the first imaging unit 23 in the present embodiment) images the reflective element 4 to which the measurement light is input.

The input information acquisition unit 262 acquires input information about the input of the measurement light from the image of the reflective element 4 imaged by the imaging unit (the first imaging unit 23 in the present embodiment).

The position measurement device 1a corrects the position information acquired by the position measurement unit 20 on the basis of the input information.

With this configuration, the position measurement device 1a according to the present embodiment can improve the accuracy of the position information as compared to the case where the correction process is not performed because it is possible to correct the position information of the reflective element 4 on the basis of the input information.

Also, the position measurement device 1a according to the present embodiment includes the position measurement unit 20.

The position measurement unit 20 is a position measurement unit that irradiates measurement light to the input surface of the reflective element 4a, receives reflected light, and acquires position information of the reflective element 4a in the three-dimensional space.

The position measurement unit 20 includes a distance measurement unit 200 and an irradiation direction movement unit 201.

The distance measurement unit 200 irradiates measurement light to the reflective element 4a, receives the reflected light, and measures a distance to the reflective element 4a.

The irradiation direction movement unit 201 moves the irradiation direction of the measurement light.

The irradiation direction movement unit 201 sequentially moves and irradiates measurement light toward the plurality of reflective elements 4a provided on the measurement target object (the robot T4 in the present embodiment).

With this configuration, the position measurement device 1a according to the present embodiment can acquire position information of the plurality of reflective elements 4a according to a simple configuration without having to provide a plurality of irradiation units for irradiating measurement light because it is possible to acquire the position information of the plurality of reflective elements 4a on the basis of one measurement light beam.

Fourth Embodiment

Hereinafter, a fourth embodiment of the present invention will be described in detail with reference to the drawings.

In each of the above-described embodiments, a case where the position measurement device is installed on the floor of a factory, a workpiece, or the like has been described. In the present embodiment, a case where the position measurement device includes a movement device will be described.

The position measurement device according to the present embodiment is referred to as a movable position measurement device 1b.

In addition, components identical to those of the first embodiment described above may be denoted by the same reference signs and description of the same components and operations may be omitted.

Figure 25:
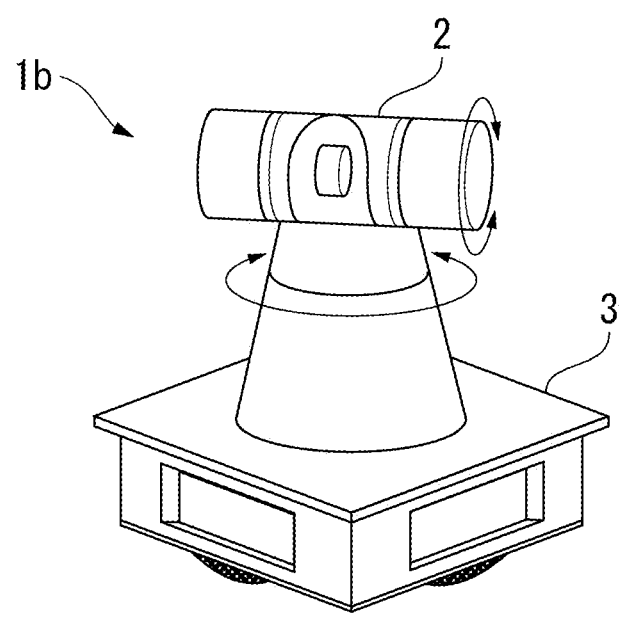
FIG. 25 is a diagram showing an example of the appearance of a movable position measurement device according to a fourth embodiment.

FIG. 25 is a diagram showing an example of the appearance of the movable position measurement device 1b according to the present embodiment. The movable position measurement device 1b includes a position measurement device 2 and a movement device 3. Because the configuration of the position measurement device 2 is similar to the configuration of any one of the position measurement devices 1 and 1a of the above-described embodiments, description thereof will be omitted.

The position measurement device 2 is placed in the movement device 3. The movement device 3 is movable. Thereby, the position measurement device 2 is conveyed by the movement device 3. The movement device 3 includes wheels, a caterpillar, and the like, and runs automatically. Thereby, the movement device 3 can move freely in the factory. The movement device 3 is, as an example, an unmanned conveyance vehicle (an automatic guided vehicle (AGV)). In addition, the AGV is referred to as an unmanned conveyance robot.

In addition, the movement device 3 may be a conveyance machine other than an AGV as long as it can be moved with the position measurement device 2 placed thereon. Also, the movement device 3 may be configured to move in a predetermined range or along a predetermined course in the factory. For example, the movement device 3 may move along a rail or the like provided in the factory.

Because the movement device 3 can move in the factory, it can also be moved relative to the reflective element 4 installed in the robot installed in the factory. Therefore, the movable position measurement device 1b includes the movement device 3 that can be moved relative to the reflective element 4.

Because the movable position measurement device 1b can move in the factory where a plurality of three-dimensional measuring machines and machine tools are installed, one movable position measurement device 1b can sequentially measure the positions of the measurement target object in the three-dimensional space with respect to the three-dimensional measuring machines and machine tools.

Also, when the position measurement device 1 described in the first embodiment is used as the position measurement device 2, the position of the measurement target object for the measurement reference object can be measured with high accuracy even if the position of the movable position measurement device 1b changes due to movement because the reference position measurement unit 21 can measure the position of the measurement target object using the measurement reference object as a reference.

Also, when the position measurement device 1a described in the second embodiment is used as the position measurement device 2, it is possible to measure the position of the measurement target object for the measurement reference object with high accuracy because an error occurring in accordance with the input position and the input angle can be corrected even if the input position and angle of the measurement light to the reflective element 4 installed on the measurement target object change due to movement.

In addition, a part of each of the position measurement devices 1 and 1a and the movable position measurement device 1b in the above-described embodiment, for example, the control unit 22 and the calculation units 26 and 26a, may be configured to be implemented in a computer. In this case, this control function may be implemented by recording a program for implementing the control function on a computer-readable recording medium and causing a computer system to read and execute the program recorded on the recording medium. In addition, the "computer system" used herein is assumed to include an operating system (OS) and hardware such as peripheral equipment in the computer system embedded in the position measurement devices 1 and 1a and the movable position measurement device 1b. Also, the "computer-readable recording medium" refers to a flexible disk, a magneto-optical disc, a read-only memory (ROM), a portable medium such as a compact disc (CD)-ROM, or a storage device such as a hard disk embedded in the computer system. Furthermore, the "computer-readable recording medium" may include a computer-readable recording medium for dynamically holding the program for a short time period as in a communication line when the program is transmitted via a network such as the Internet or a communication circuit such as a telephone circuit and a computer-readable recording medium for holding the program for a given time period as in a volatile memory inside the computer system serving as a server or a client when the program is transmitted. Also, the above-described program may be a program for implementing some of the above-described functions. Furthermore, the above-described program may be a program capable of implementing the above-described function in combination with a program already recorded on the computer system.

Also, some or all of the position measurement devices 1 and 1a and the movable position measurement device 1b in the above-described embodiments may be implemented as an integrated circuit such as a large-scale integration (LSI) circuit. Also, the functional blocks of the position measurement devices 1 and 1a and the movable position measurement device 1b in the above-described embodiments may be individually constructed as processors or some or all functional blocks may be integrated and constructed as processors. Also, a method of forming an integrated circuit is not limited to an LSI circuit, but may be implemented with dedicated circuits or general-purpose processors. Also, in the case where the integrated circuit technology which is substituted for an LSI circuit appears due to the advance of the semiconductor technology, an integrated circuit based on the technology may be used.

Although embodiments of the present invention have been described above in detail with reference to the drawings, specific configurations are not limited to the embodiments and design changes and the like may also be included without departing from the spirit and scope of the present invention.

REFERENCE SIGNS LIST 1, 1a Position measurement device
1b Movable position measurement device
4 Reflective element
4, 5 Reference reflective element
20 Position measurement unit
21 Reference position measurement unit

The invention claimed is:
1. A position measurement device comprising:
circuitry configured to
   irradiate measurement light to a reflective element;
   receive reflected light reflected by the reflective element;
   acquire position information of the reflective element in a three-dimensional space;
   irradiate reference measurement light to at least one reference reflective element;
   receive reference reflected light reflected by the reference reflective element;
   acquire position information of the reference reflective element in a three-dimensional space; and
   correct the position information of the reflective element using the position information of the reference reflective element.
2. The position measurement device of claim 1, wherein the circuitry is configured to acquire relative position information of the reflective element using the position information of the reference reflective element as a reference.

3. The position measurement device of claim 1, wherein the circuitry is configured to acquire different position information of each of a plurality of different reference reflective elements.

4. The position measurement device of claim 3, wherein the circuitry is configured to:
acquire position information of at least three of the reference reflective elements; and
acquire the position information of the reflective element with respect to a reference set using the position information of the at least three of the reference reflective elements.

5. The position measurement device of claim 3, wherein the circuitry is configured to:
acquire position information of at least three of the reference reflective elements;
determine a reference coordinate system using the position information of the at least three of the reference reflective elements; and
acquire the position information of the reflective element in the reference coordinate system.

6. The position measurement device of claim 5, wherein correcting the position information of the reflective element includes arranging the reflective element at a predetermined position in the reference coordinate system and causing position information obtained in a measurement process to match position information of the predetermined position in the reference coordinate system.

7. The position measurement device of claim 1, wherein the circuitry is configured to correct the position information of the reflective element over time.

8. The position measurement device of claim 1, wherein the circuitry is configured to correct the position information of the reflective element due to temperature and atmospheric pressure of a space where the reflective element and the reference reflective element are arranged based on the acquired position information of the reference reflective element.

9. The position measurement device of claim 1, wherein the circuitry is configured to measure a distance to the reflective element;
move an irradiation direction of the measurement light;
measure the irradiation direction; and
acquire the position information of the reflective element in a three-dimensional space based on the measured distance to the reflective element and the measured irradiation direction.

10. The position measurement device of claim 9, wherein the circuitry is configured to:
measure a distance to the reference reflective element;
measure an irradiation direction of the reference measurement light; and
acquire the position information of the reference reflective element in a three-dimensional space from the measured distance to the reference reflective element and the measured irradiation direction of the reference measurement light.

11. The position measurement device of claim 10, wherein
the measurement light and the reference measurement light are branched from the same light source and supplied.

12. The position measurement device claim 9, further comprising:
a sensor configured to detect the reflected light, wherein
the sensor detects movement of the reflected light moving with movement of the reflective element, and
the circuitry is configured to move the irradiation direction in accordance with the movement of the reflected light detected by the sensor.

13. The position measurement device of claim 12, wherein
the sensor is an imaging device configured to capture an image of the reflective element or a photoelectric detection device configured to detect a light amount of the reflected light.

14. The position measurement device of claim 12, wherein
an optical path through which the measurement light passes is partially identical to an optical path through which the reflected light passes.

15. The position measurement device of claim 12, further comprising:
an image sensor different from the sensor, wherein
the image sensor is configured to capture an image of the reflective element.

16. The position measurement device of claim 15, wherein
an optical path through which the measurement light passes, an optical path through which the reflected light passes, and an optical path of the image sensor are partially identical to each other.

17. The position measurement device of claim 1, wherein
the reflective element is provided on a measurement target object capable of movement and the reference reflective element is provided on a measurement reference object different from the measurement target object.

18. The position measurement device of claim 17, wherein
the measurement target object and the measurement reference object constitute one device, and
a device coordinate system serving as a reference of position information of the measurement target object in the one device is determined based on position information of the reference reflective element acquired by the circuitry.

19. A position measurement method comprising:
irradiating measurement light to a reflective element, receiving reflected light reflected by the reflective element, and acquiring position information of the reflective element in a three-dimensional space;
irradiating reference measurement light to at least one reference reflective element, receiving reference reflected light reflected by the reference reflective element, and acquiring position information of the reference reflective element in a three-dimensional space; and
correcting the position information of the reflective element using the position information of the reference reflective element.

20. A position measurement system comprising:
first circuitry configured to
irradiate measurement light to a reflective element;
receive reflected light reflected by the reflective element; and
acquire position information of the reflective element in a three-dimensional space;

second circuitry configured to
irradiate reference measurement light to at least one reference reflective element;
receive reference reflected light reflected by the reference reflective element; and
acquire position information of the reference reflective element in a three-dimensional space, wherein
the position information of the reflective element is corrected using the position information of the reference reflective element.

* * * * *